United States Patent
Zhang et al.

(10) Patent No.: US 9,971,681 B2
(45) Date of Patent: May 15, 2018

(54) LAZY REAL TIME GARBAGE COLLECTION METHOD

(71) Applicant: Nanjing University, Nanjing (CN)

(72) Inventors: Qi Zhang, Nanjing (CN); Xuandong Li, Nanjing (CN); Linzhang Wang, Nanjing (CN); Tian Zhang, Nanjing (CN); Yi Wang, Shenzhen (CN); Zili Shao, Kowloon (HK)

(73) Assignee: Nanjing University, Nanjing (CN)

( * ) Notice: Subject to any disclaimer, the term of this patent is extended or adjusted under 35 U.S.C. 154(b) by 107 days.

(21) Appl. No.: 15/170,202

(22) Filed: Jun. 1, 2016

(65) Prior Publication Data
US 2017/0351603 A1   Dec. 7, 2017

(51) Int. Cl.
*G06F 12/00* (2006.01)
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0604* (2013.01); *G06F 3/064* (2013.01); *G06F 3/0652* (2013.01); *G06F 3/0659* (2013.01); *G06F 3/0679* (2013.01); *G06F 2212/1016* (2013.01); *G06F 2212/214* (2013.01); *G06F 2212/7205* (2013.01)

(58) Field of Classification Search
CPC ... G06F 12/0246; G06F 3/0679; G06F 3/0652
USPC .......................................... 711/103
See application file for complete search history.

(56) References Cited

U.S. PATENT DOCUMENTS 7,421,694 B2 * 9/2008 Gosalia ................. G06F 9/4843
711/204

OTHER PUBLICATIONS

Zhang, Q. et al., "Lazy-RTGC: A Real-Time Lazy Garbage Collection Mechanism with Jointly Optimizing Average and Worst Performance for NAND Flash Memory Storage Systems", Nanjing University, The Hong Kong Polytechnic University, ACM Transactions on Design Automation of Electronic Systems, vol. 20, No. 3, Article 43, Jun. 2015, 32pgs.

\* cited by examiner

*Primary Examiner* — Jae Yu
(74) *Attorney, Agent, or Firm* — Duane Morris LLP

(57) ABSTRACT

A method for garbage collection in a NAND flash memory system is disclosed. The method includes the steps of receiving a data request task in the NAND flash memory system; executing the data request task in the NAND flash memory system; based on the condition where the number of free data pages in the NAND flash memory system is below the first pre-determined threshold, determining whether a data block partial garbage collection list is empty; based on the condition where the data block partial garbage collection list is empty, selecting a victim block in the NAND flash memory system; and creating a plurality of data block partial garbage collection tasks.

19 Claims, 14 Drawing Sheets

An example task scheduling in lazy-RTGC.

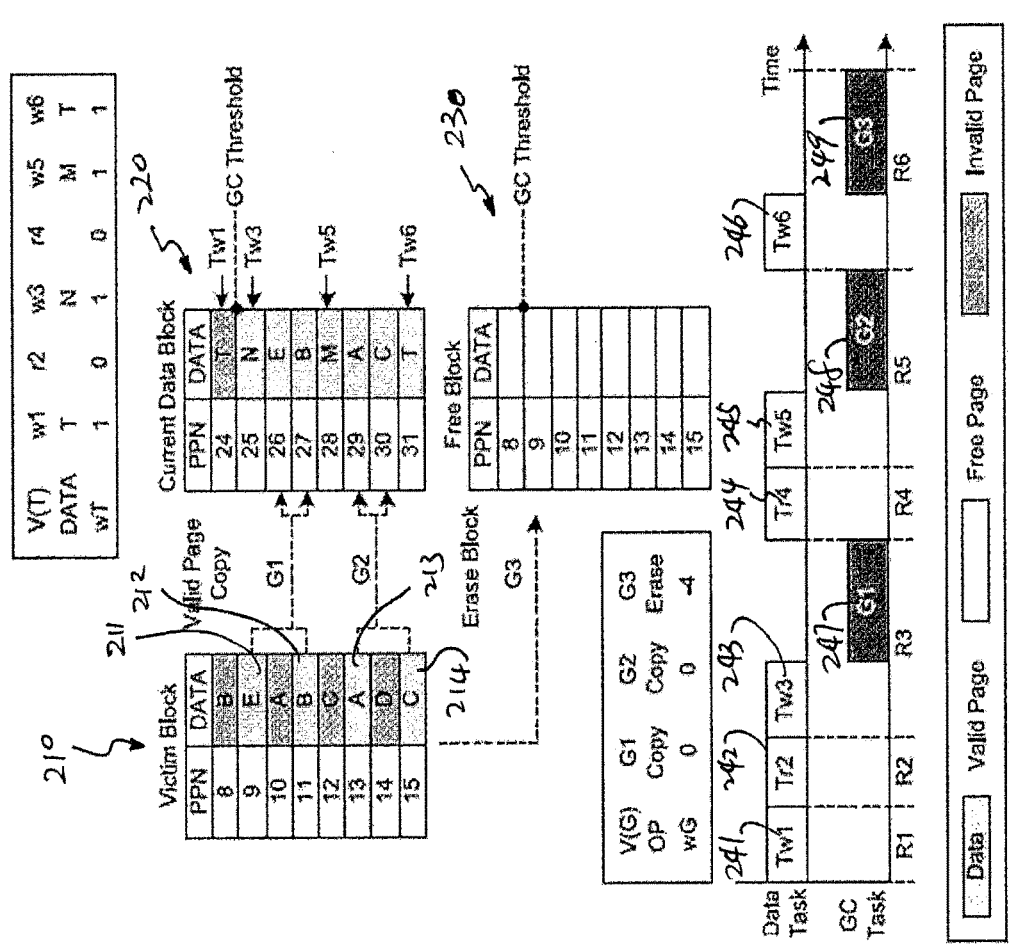
Fig. 2. An example task scheduling in lazy-RTGC.

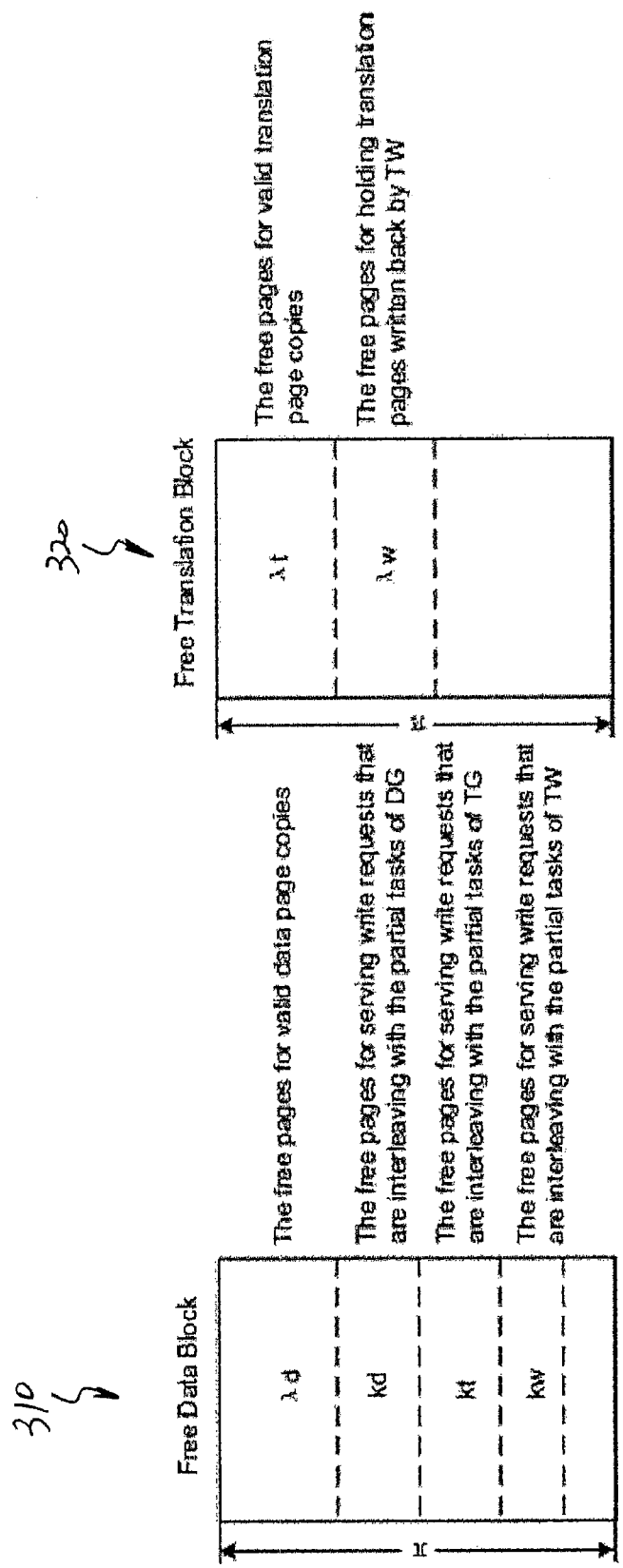
Fig. 3. An example of Lazy-RTGC for DFTL.

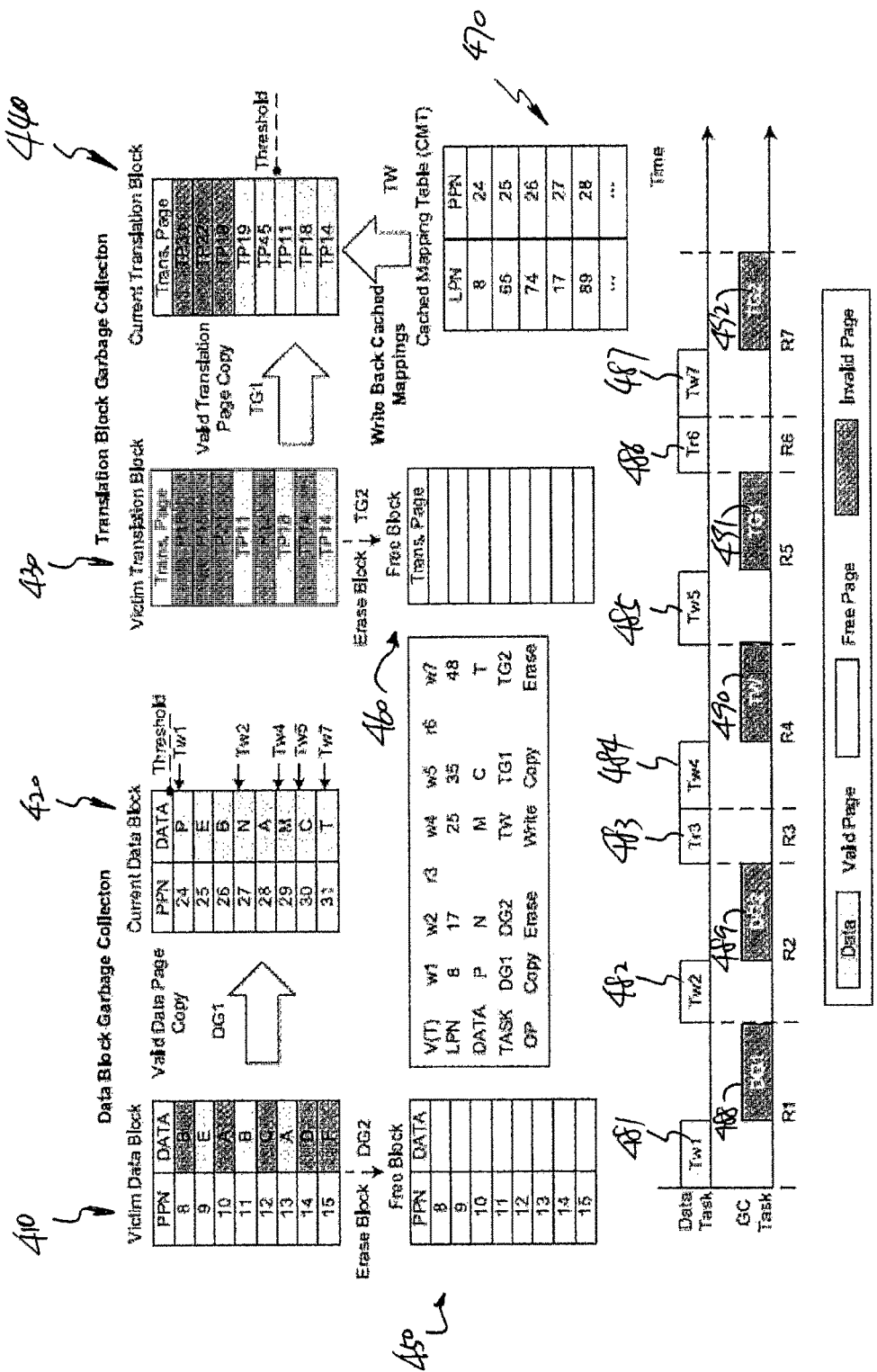
Fig. 4. An illustrative example to show how Lazy-RTGC for DFTL works.

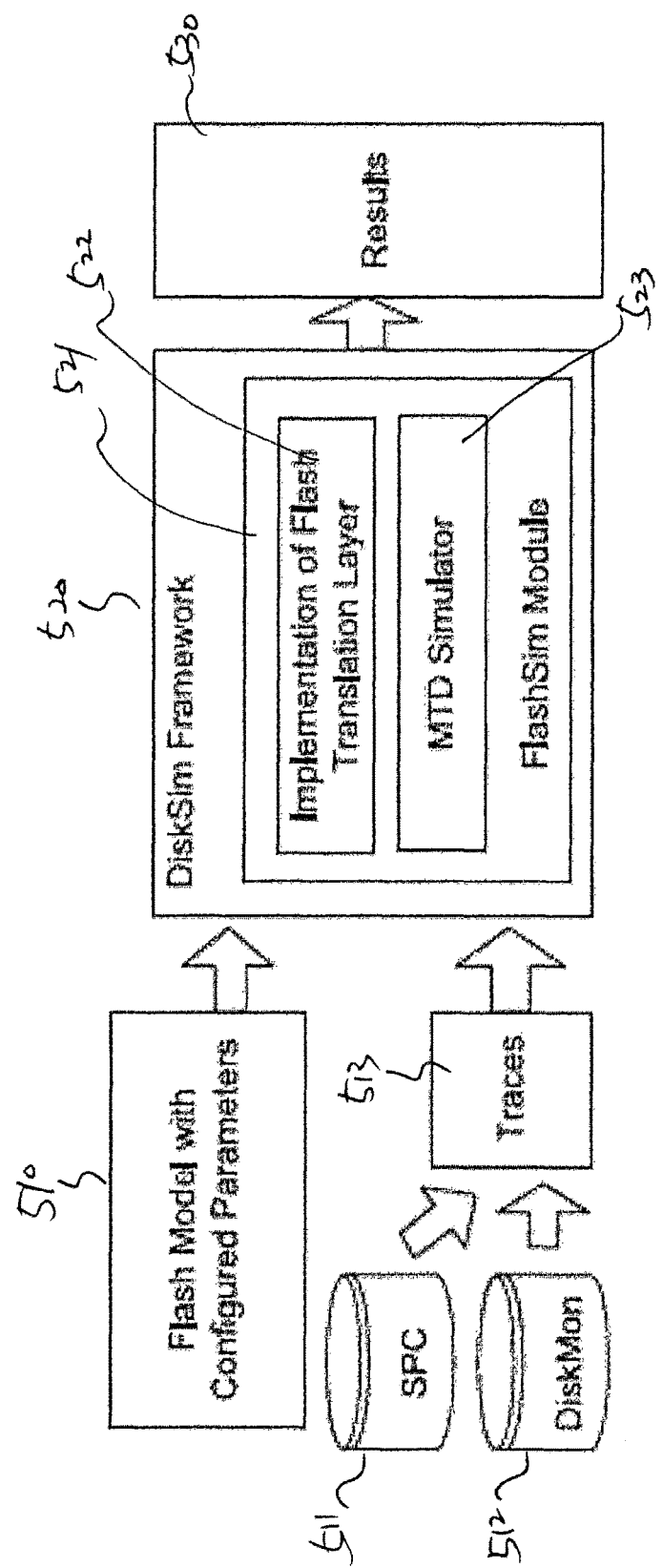
Fig. 5. The framework of simulation platform.

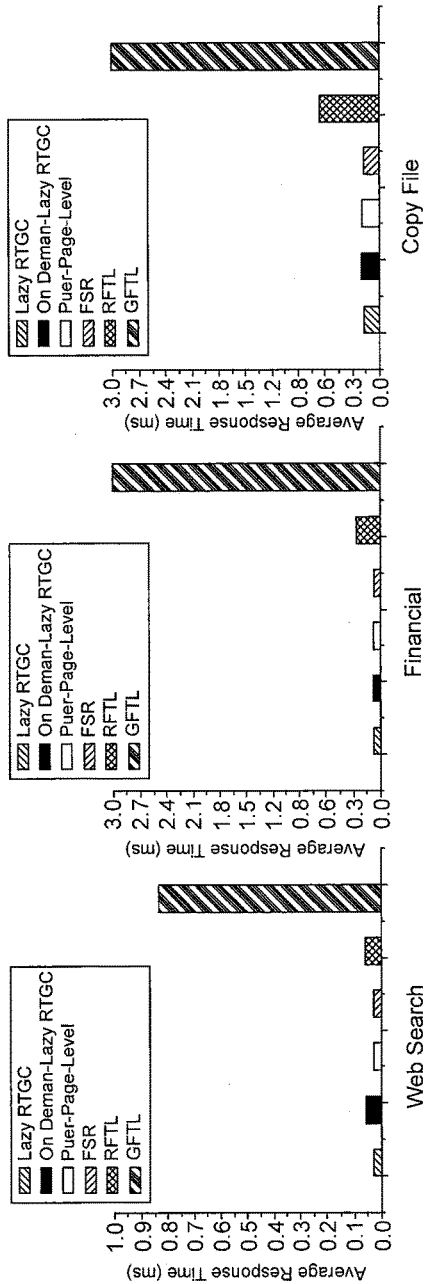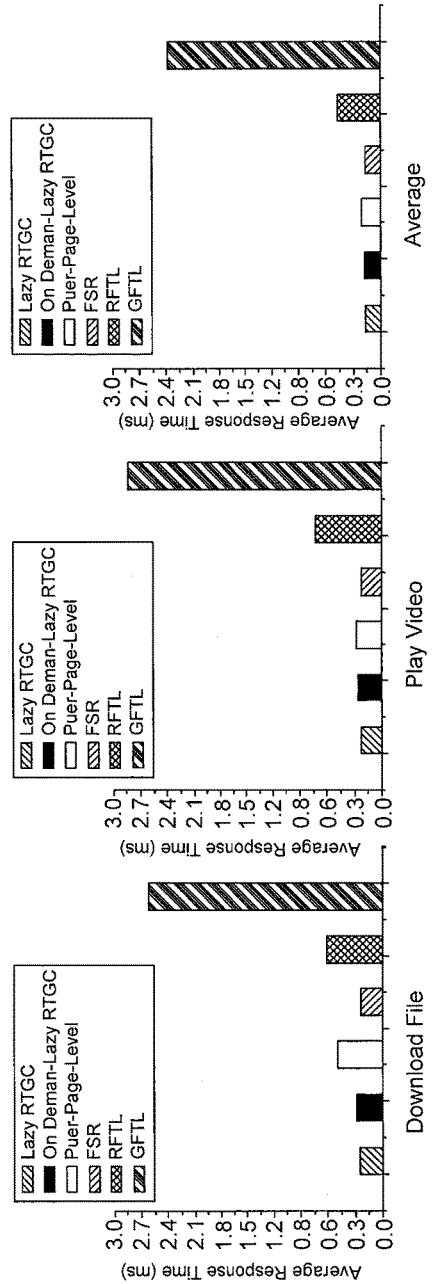
FIG. 7A Web Search
FIG. 7B Financial
FIG. 7C Copy File
FIG. 7D Download File
FIG. 7E Play Video
FIG. 7F Average

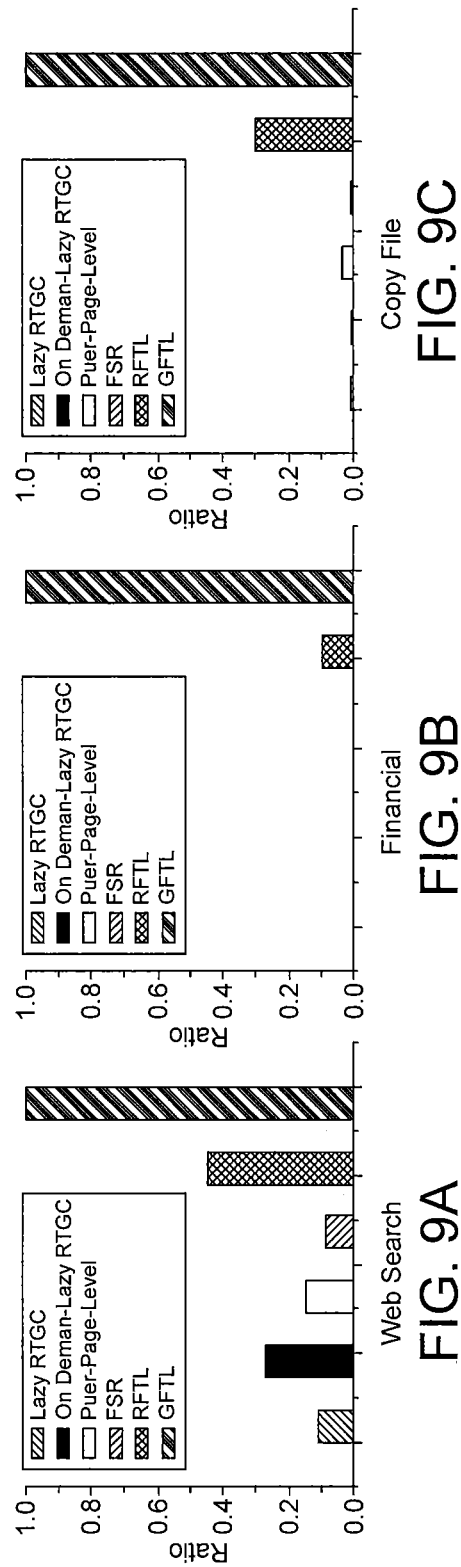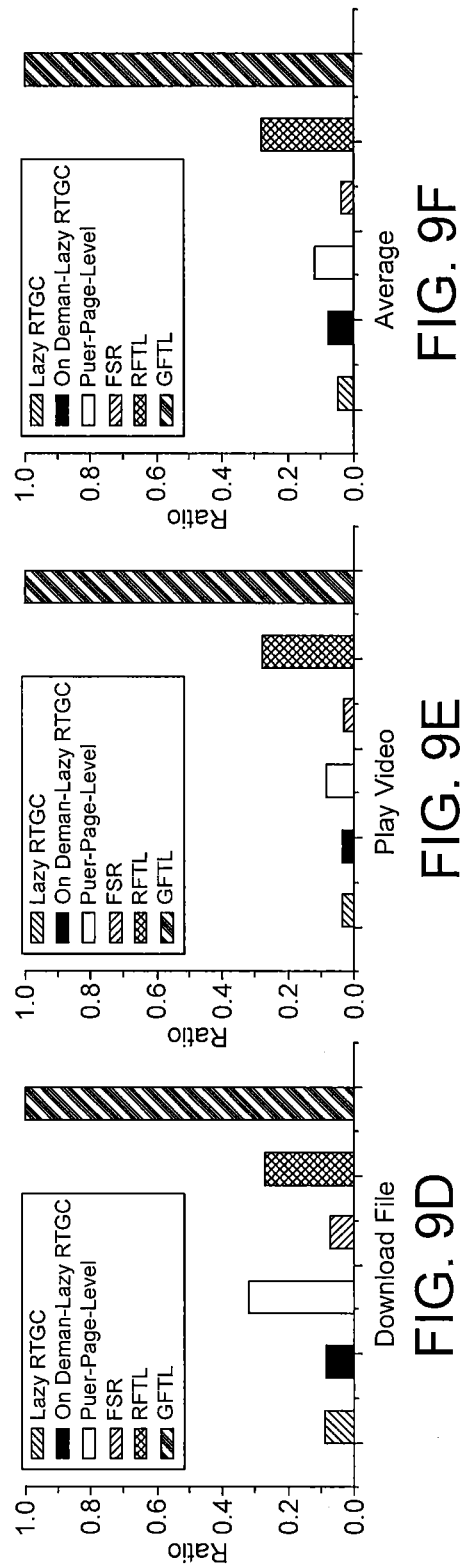

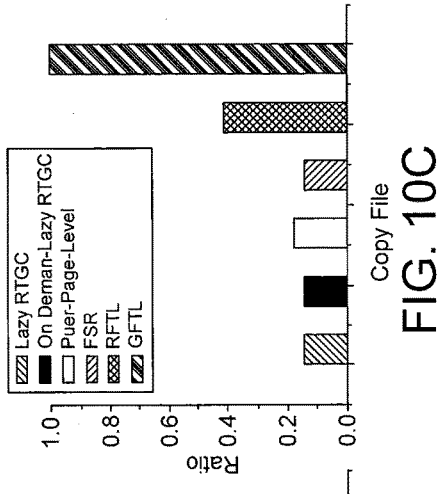
FIG. 10A Web Search
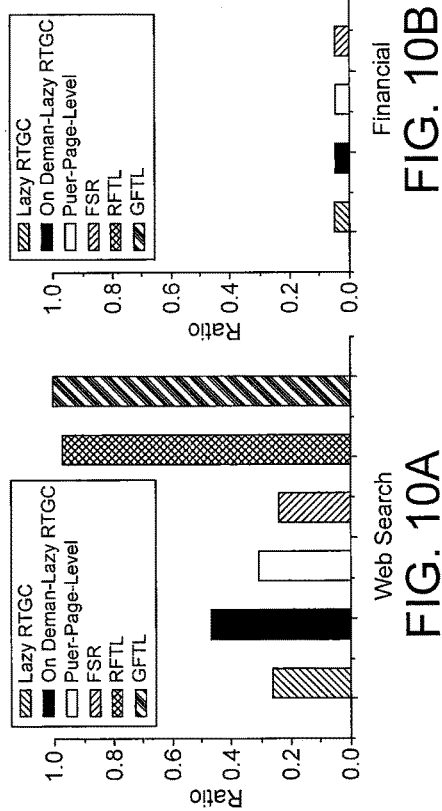
FIG. 10D Download File
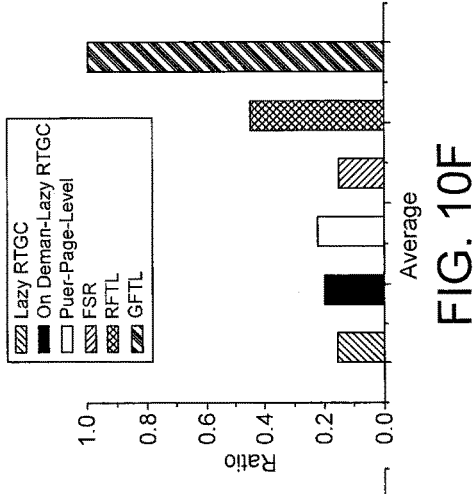
FIG. 10B Financial
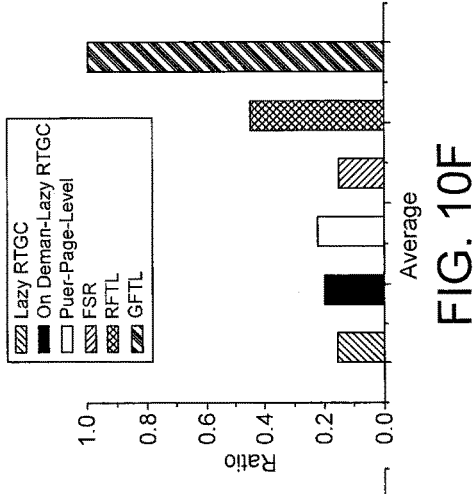
FIG. 10E Play Video
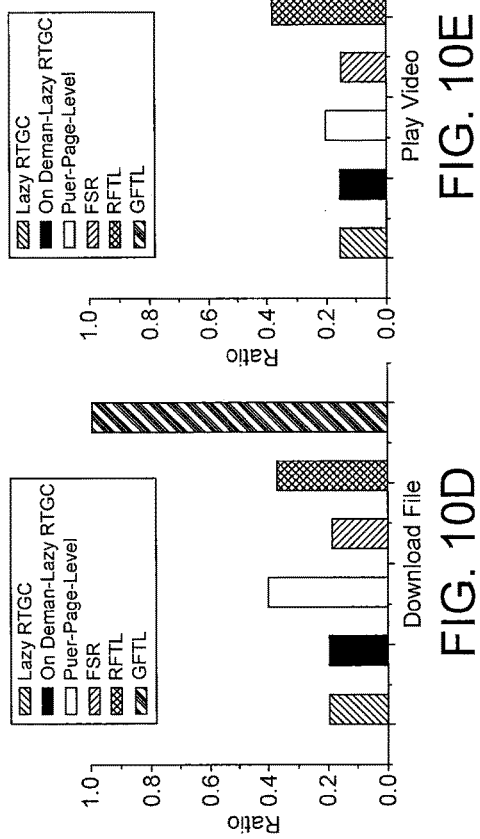
FIG. 10C Copy File
FIG. 10F Average

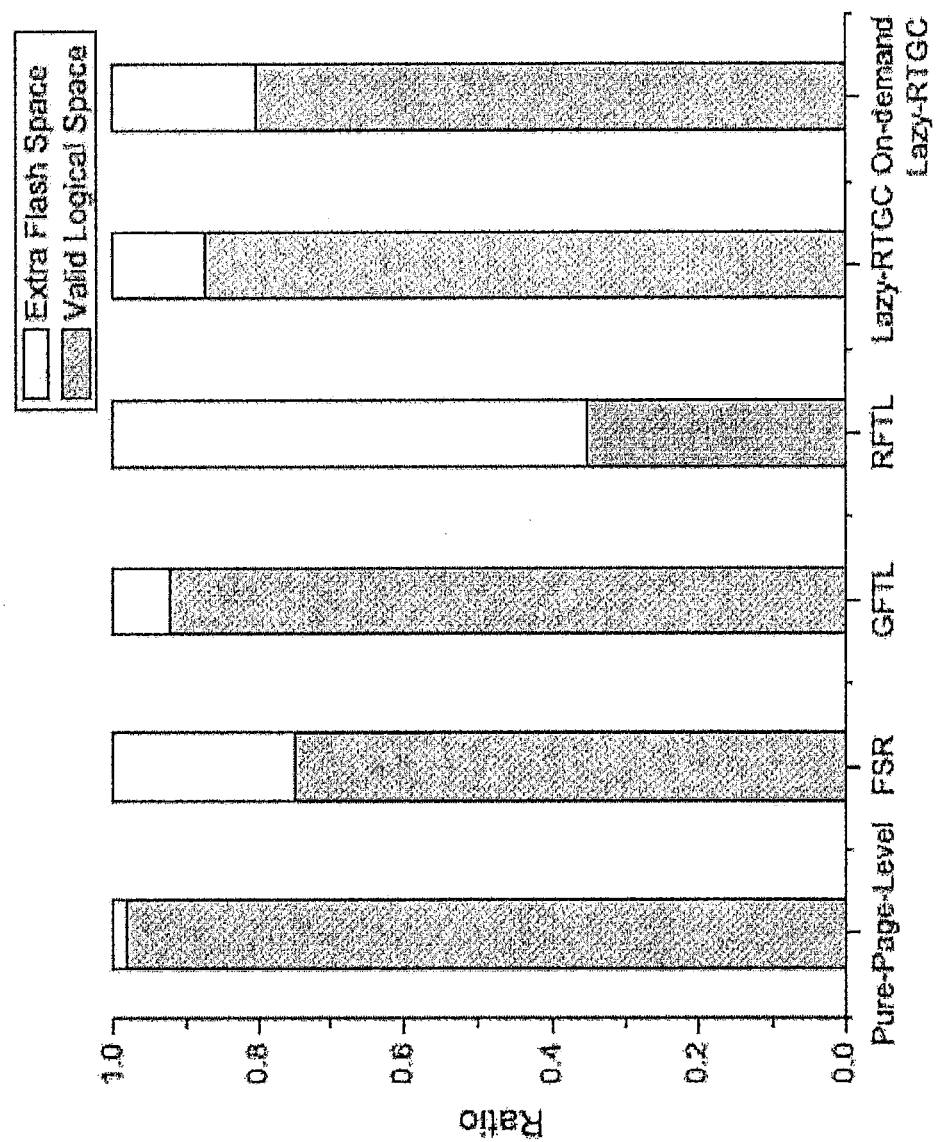
Fig. 11. The space utilization ratio.

LAZY REAL TIME GARBAGE COLLECTION METHOD

BACKGROUND

NAND flash memory storage systems possess many attractive properties, such as low power consumption, fast access time and shock resistance. As a result, NAND flash memory has been widely adopted in mission-critical hard real-time systems such as aerospace systems, as well as soft real-time systems such as iPhones and tablets. A NAND flash memory storage system is different from other real-time systems in that the NAND flash memory system needs to provide both the worst case scenario system response time and average scenario system response time.

There are two approaches in conventional real time garbage collection for NAND flash storage systems. The first one is the task-driven free-space replenishment approach, and the second one is the partial garbage collection approach. The first approach aims to replenish several free pages to ensure that there will be enough free space to execute each real-time task. The second approach partitions one garbage collection process into several steps and distributes these steps to different time slots.

In the conventional approaches, due to unique constraints for NAND flash memory storage systems, the concept of garbage collection is different from that of the dynamic memory system. In particular, due to the constraint of "out of place update" in flash memory, the number of valid page copy operations in the victim block is unpredictable. Such uncertainties negatively impact the predictability of system response time, which renders the garbage collection management a major bottleneck for improving system performance.

In the conventional approaches discussed above, in order to provide a lower bound of the reclaimed space, the systems have to store the runtime information of each real-time task, which normally requires significant modification to existing file systems. In addition, the partial garbage collection mechanism needs to allocate certain extra physical blocks as a write buffer, and a queue needs to be maintained to record the garbage collection information. In the conventional partial garbage collection approach, the process of garbage collection is triggered at a relatively early stage. Such early triggering may further introduce a large amount of unnecessary garbage collection with a large number of extra valid page copies.

In order to solve the performance issue of partial garbage collection, a real-time flash translation layer (FTL) is proposed ("RFTL"). In RFTL, the partial garbage collection is distributed to different logical blocks, and each logical block is pre-allocated to three physical blocks (i.e., a primary block, a buffer block and a replacement block). RFTL can significantly reduce the number of unnecessary garbage collection processes. The first draw-back of RFTL is that the flash-space utilization of RFTL is relatively low. The second draw-back of RTFL is that the garbage collection process is triggered at an early stage due to RTFL's fixed physical block allocation. In spite of the fact that existing schemes satisfy real-time requirements, existing schemes make no attempt to provide a guaranteed average system response time. In addition, the space utilizations of existing schemes are very low because these schemes allocate a large amount of extra flash memory space to ensure real-time performance.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is a diagram illustrating task scheduling in lazy-RTGC in accordance with some embodiments of the present disclosure.

FIG. 3 is a diagram illustrating lazy-RTGC for DFTL in accordance with some embodiments of the present disclosure.

FIG. 4 is a diagram illustrating the mechanism of lazy-RTGC for DFTL in accordance with some embodiments of the present disclosure.

FIG. 5 is a functional diagram illustrating the framework of simulation platform in accordance with some embodiments of the present disclosure.

FIGS. 7(a) through 7(e) are bar charts comparing the average response time of Lazy-RTGC with the average response time of on-demand lazy-RTGC, pure-page-level, FSR, RFTL and GFTL for web search, financial, copy file, download file, and play video applications, FIG. 7(f) is a bar chart of the average of average response time in accordance with some embodiments of the present disclosure.

FIGS. 9(a) through 9(e) are bar charts comparing the normalized number of valid page copies of lazy-RTGC with the normalized number of valid page copies of on-demand lazy-RTGC, pure-page-level, FSR, RFTL and GFTL for web search, financial, copy file, download file, and play video applications, FIG. 9(f) is a bar chart of the average of the normalized number of valid page copies in accordance with some embodiments of the present disclosure.

FIGS. 10(a) through 10(e) are bar charts comparing the normalized number of block-erase counts of lazy-RTGC with the normalized number of block-erase counts of on-demand lazy-RTGC, pure-page-level, FSR, RFTL and GFTL for web search, financial, copy file, download file, and play video applications, FIG. 10(f) is a bar chart of the average of the normalized number of block-erase counts in accordance with some embodiments of the present disclosure.

FIG. 11 is a bar chart comparing the space utilization ratio of lazy-RTGC with the space utilization ratio of block-erase counts of on-demand lazy-RTGC, pure-page-level, FSR, RFTL and GFTL in accordance with some embodiments of the present disclosure.

DETAILED DESCRIPTION

Figure 1A:
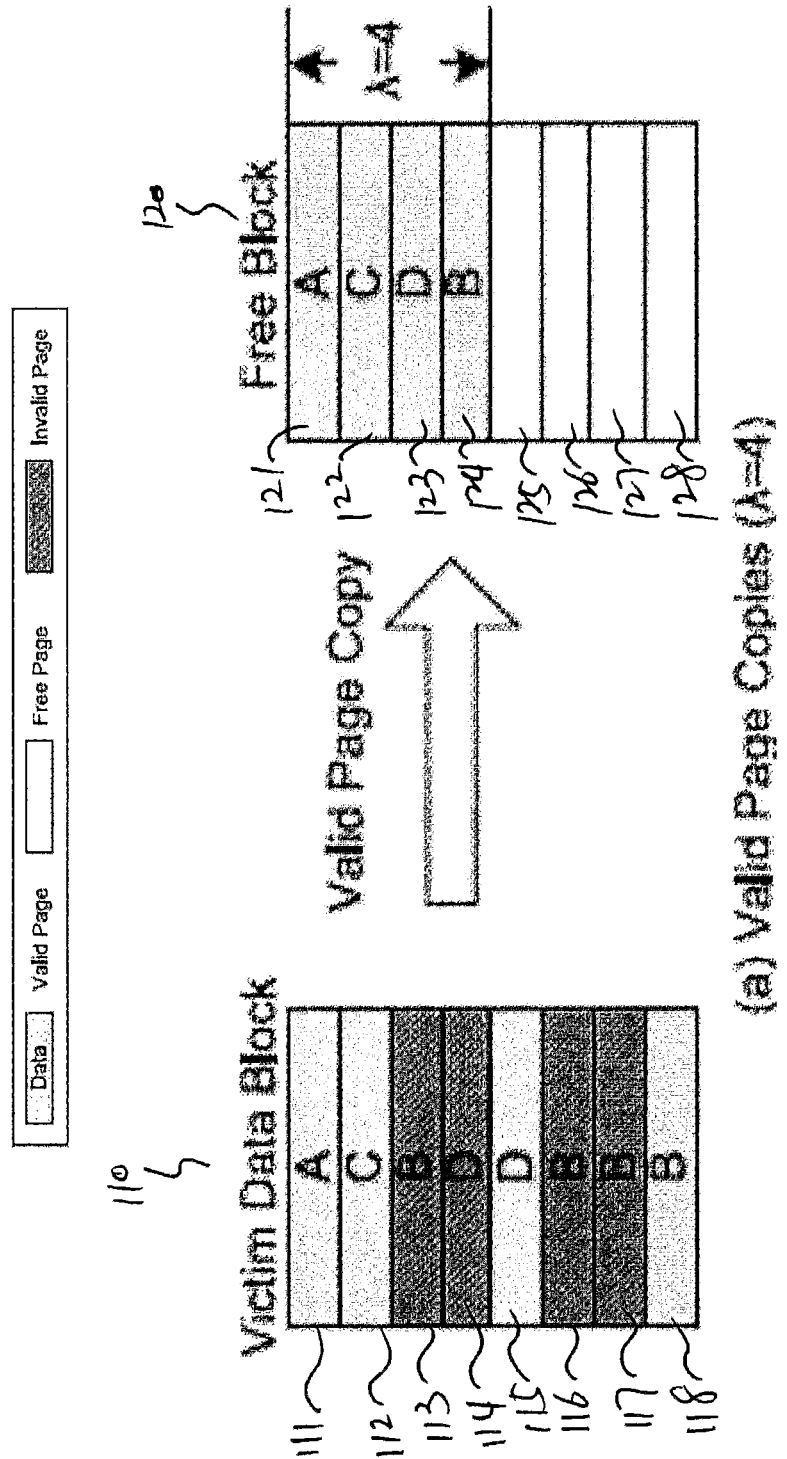
FIG. 1A is a diagram illustrating valid copies in non-deterministic garbage collection in accordance with some embodiments of the present disclosure.

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Various embodiments in this application are also described in details in Zhang et al, ACM Transactions on Design Automation of Electronic Systems, Vol. 20, No. 3, Article 43, June 2015, which is incorporated by reference in its entirety.

In order to solve the problems associated with existing schemes, in the present implementation, a real-time lazy garbage collection (lazy-RTGC) mechanism is implemented. According to some embodiments, the lazy-RTGC ensures guaranteed system response time for both the worst case and average case scenarios with the minimum space requirement. Lazy-RTGC adopts the page-level mapping scheme that fully utilizes the flash memory space and effectively postpones the garbage collection process as late as possible. Accordingly, the lazy-RTGC does not need to pre-allocate a fixed number of physical spaces as the write buffer. As a result, lazy-RTGC provides optimized average system response time. Through space configuration after each garbage collection, lazy-RTGC guarantees the number of reclaimed free space above a lower threshold. The entire process of garbage collection is divided into a set of partial garbage collections. Such division provides an upper bound of service time. The reclaimed free space from the previous set of partial garbage collections, which is considered as a free write buffer, is further implemented in the next partial garbage collection set. As a result, the present implementation not only guarantees the reclaimed free space of garbage collection, but also provides a deterministic service time of garbage collection in the worst case.

According to the analysis, the page-level mapping scheme is the best option to sufficiently manage the flash space and delay garbage collection. In order to reduce the large mapping table in the page-level address mapping scheme, lazy-RTGC adopts a demand-based page-level mapping scheme that can significantly reduce the RAM footprint and achieve similar performance as block-level mapping schemes. Only the on-demand address mappings will be allocated and stored in the cache. In addition, Lazy-RTGC does not require changes to the file system and NAND flash memory chip, as a result, Lazy-RTGC is a general strategy that can be applied to any page-level address mapping schemes.

Lazy-RTGC is implemented in the FlashSim framework. A set of benchmarks from both real-world and synthetic traces are implemented to evaluate the effectiveness of Lazy-RTGC. In the present implementation, Lazy-RTGC is compared with FSR, GFTL, RFTL, and the Pure-Page-Level mapping scheme in terms of system response time in the following scenarios: the worst case, the average system response time, valid page copies, block-erase counts, and the space utilization ratio. FSR (free-space replenishment) guarantees the reclaimed free space after each garbage collection process. GFTL and RFTL are representative schemes that adopt a partial garbage collection technique. The Pure-Page-Level scheme is a page-level address mapping scheme without applying any real-time mechanisms.

The present implementation shows that the lazy-RTGC scheme achieves better worst-case system performance and average-case system performance compared to conventional approaches. For system response time in the worst case, the lazy-RTGC scheme achieves 90.58% improvement compared to the pure-page-level FTL scheme. For average response time, the lazy-RTGC scheme improves 94.08% and 66.54% average system performance compared to GFTL and RFTL, respectively. For the number of valid page copies, the lazy-RTGC scheme achieves 95.36% and 86.11% reductions compared to GFTL and RFTL, respectively. For the reason that many valid page copies are reduced, the lazy-RTGC scheme also significantly reduces the number of block-erase counts. For space utilization, the lazy-RTGC scheme achieves 87.5% space utilization, which is very close to GFTL and much higher compared to RFTL. Accordingly, by costing small extra flash space, the lazy-RTGC scheme not only provides an upper bound of the worst system response time, but also significantly improves the average system performance and endurance of NAND flash memory storage systems.

In the present implementation, each I/O request issued from the file system to NAND flash chip is modeled as an independent real-time task $T=\{p_T, e_T, w_T, d_T, r_T\}$, where $p_T$, $e_T$, $w_T$, $d_T$, and $r_T$ denote the period, execution time, and the maximum number of page writes per period, deadline, and the release time of the task, respectively. According to some embodiments, it is assumed that the deadline d of each task is equal to period p. There are two kinds of data request task: read task ($T_r$) and write task ($T_w$). According to some embodiments, w is equal to 0 if it is a read task; w is equal to 1 if it is a write task. According to some embodiments, $p_T$ represents the frequency of read and write requests issued from the file system. According to some embodiments, $e_T$ denotes the time of executing a read or write request, which is determined by the specific NAND flash memory. The lower bound on $p_T$ (i.e., $L(p_T)$) determines the maximum arrival rate that the flash storage system can handle. The upper bound on $e_T$ (i.e., $U(e_T)$) represents the longest execution time of a request that would be served by the flash memory storage system.

The release time of the data request task depends on the request execution time and the location of the task in the queue. According to some embodiments, the garbage collection process is independent from the logical address of coming data tasks. According to some embodiments, the execution of the data request task in the queue does not influence the current garbage collection process. As a result, the release time of each task $T_i$ is calculated as the following:

$$r_{T_i} = \sum_{j}^{n_w} e_{T_j} + \sum_{k}^{n_r} e_{T_k} + e_{T_i}. \quad (1)$$

In Eq. (1), $n_w$ and $n_r$ represent the number of write tasks and read tasks in queue before $T_i$, respectively. According to some embodiments, the release time of $T_i$ is the sum of three execution times, i.e., the execution time of read tasks before $T_i$, of write tasks before $T_j$, and of $T_i$.

Due to the constraint of "out-of-place update" in flash memory, garbage collector is used to reclaim free pages from obsolete invalid pages. According to some embodiments, the process of garbage collection is modeled as a garbage collection task G={$p_G$, $e_G$, $w_G$, $d_G$, $r_G$}, where $p_G$ and $e_G$ represent the period and the total execution time, respectively. The total execution time of a garbage collection task includes the time cost to copy valid pages in a victim block and the time cost to erase the victim block. According to some embodiments, $w_G$ denotes the number of reclaimed pages after garbage collection. According to some embodiments, $d_G$ and $r_G$, which follow the same as definition above, represent the deadline and release time of the garbage collection task. When the number of free pages is smaller than the predefined threshold, the garbage collector will select a victim block and schedule the corresponding garbage collection task for reclaiming the victim block. For the reason that the atomic operations cannot be interrupted in the flash memory, the garbage collection task G and the data request task T depend on each other. According to some embodiments, the data request task cannot be executed until the completion of the scheduled garbage collection task.

Based on the task models discussed above, the definitions of system response time in NAND flash memory storage systems are presented below. According to some embodiments, there are two major processes during the system response time. According to some embodiments, one process is the execution time of a data request task $T_i$, which includes the time cost for logical-to-physical address translation (denoted by $t_{addr}$) and the time cost for the atomic operations (read or write operations). According to some embodiments, the other process is time cost to schedule garbage collection tasks before executing $T_i$. The system response time is given in Eq. (2).

$$t_{res} = t_{exec} + t_{addr} + t_{gc}. \quad (2)$$

According to some embodiments, in Eq. (2), $t_{res}$, $t_{exec}$, $t_{addr}$, and $t_{gc}$ represent system response time, data request execution time, address translation time, and garbage collection time, respectively. For the reason that the address translation overhead in the RAM is at least an order of magnitude less than the flash operation time, only $t_{exec}$ and $t_{gc}$ of the tasks are discussed. According to some embodiments, $t_{exec}$ and $t_{gc}$ correspond to $e_T$ and $e_G$, respectively.

According to some embodiments, the system response time is defined as the following. Given a data request task $T_i$, the garbage collector schedules a set of garbage collection tasks $V_G = \{G_1, G_2, \ldots, G_n\}$ (n=0 if there is no scheduled task $G_j$) before the execution of task $T_i$. The system response time for task $T_i$ contains the execution time of task ($e_{Ti}$) and the total execution time of the scheduled garbage collection tasks ($V_G$). According to some embodiments, $$\mathcal{R}_{T_i} = e_{T_i} + \sum_{j=1}^{n} e_{G_j}, n \geq 0. \quad (3)$$

According to some embodiments, the garbage collector is assumed to schedule only one garbage collection task for each data request task. According to some embodiments, the average system response time is defined as the following. Given a set of data request tasks $V_T = \{T_1, T_2, \ldots, T_n\}$, the average system response time is the arithmetic mean of system response time of the tasks in the $V_T$. According to some embodiments, $$\mathcal{R}_{avg} = \frac{1}{n}\sum_{i=1}^{n} \mathcal{R}_{T_i}, n > 0. \quad (4)$$

According to some embodiments, the worst-case system response time is defined as the following. The worst-case system response time in the flash memory is bounded by the worst-case execution time of the data request task ($U(e_T)$) and the worst-case execution time of the garbage collection task ($U(e_G)$). According to some embodiments:

$$\mathcal{U}(\mathcal{R}_T) = \mathcal{U}(e_T) + \mathcal{U}(e_G) \quad (5)$$
$$= \max\{t_{rd}, t_{wr}\} + (\pi - 1)(t_{rd} + t_{wr}) + t_{er}.$$

In Eq. (5), $t_{rd}$ and $t_{wr}$ denote the execution time of reading and writing one page, respectively. According to some embodiments, $\pi$ represents the total number of pages in one block. In the worst case, the garbage collector selects a victim block with $\pi-1$ valid pages.

Figure 1B:
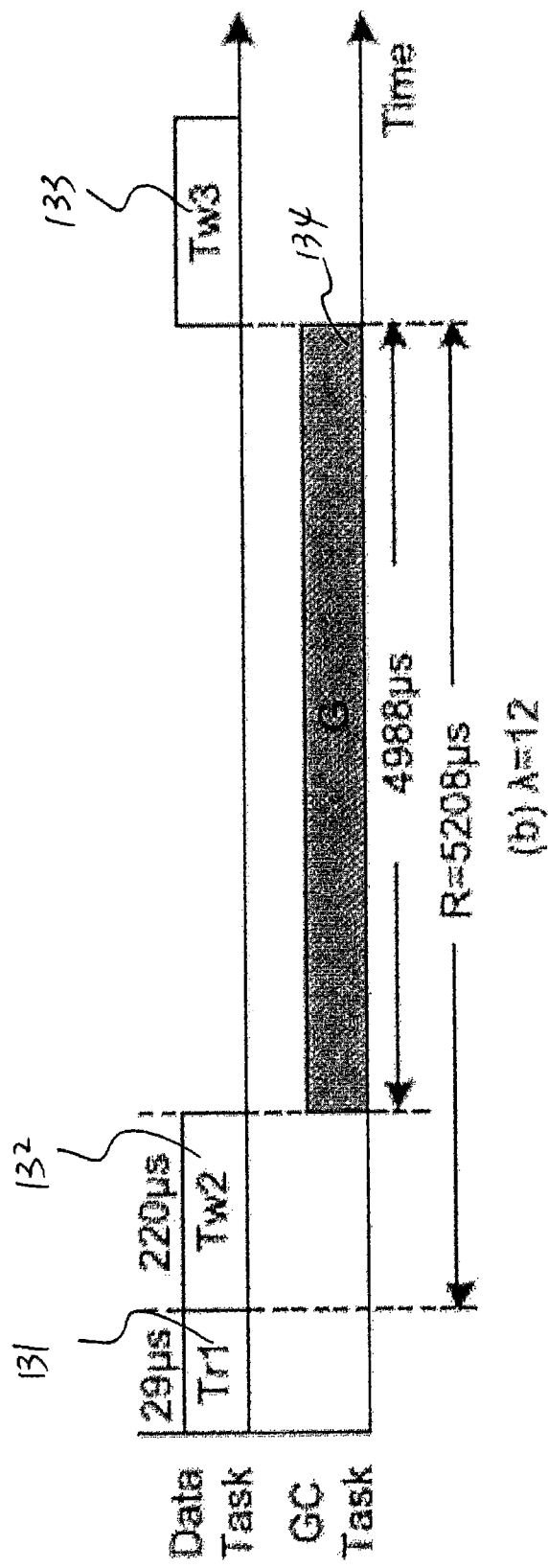
FIG. 1B is a diagram illustrating a system response time in non-deterministic garbage collection in accordance with some embodiments of the present disclosure.
Figure 1C:
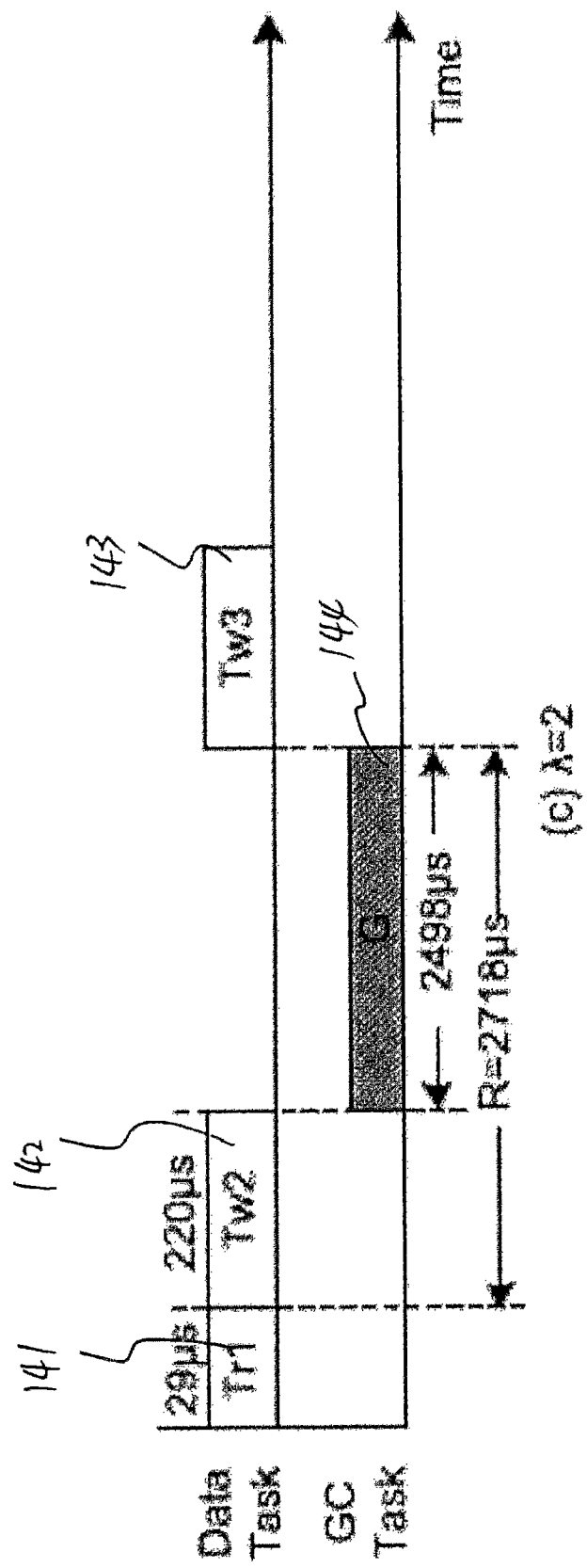
FIG. 1C is a diagram illustrating another system response time in non-deterministic garbage collection in accordance with some embodiments of the present disclosure.

FIG. 1A is a diagram illustrating valid copies in non-deterministic garbage collection in accordance with some embodiments of the present disclosure. FIG. 1B is a diagram illustrating a system response time in non-deterministic garbage collection in accordance with some embodiments of the present disclosure. FIG. 1C is a diagram illustrating another system response time in non-deterministic garbage collection in accordance with some embodiments of the present disclosure.

According to some embodiments, a garbage collection task consists of two subtasks: copying valid pages and erasing blocks. Valid page copying, which is also known as atomic copying, reads the valid data in each valid page from the victim block and writes the data into another free page. After all valid pages are copied, the erase operation is invoked in order to obtain the reclaimed free space. According to some embodiments, the total execution time ($e_G$) of one garbage collection task is defined as the following:

$$e_G = \lambda \times (t_{rd} + t_{wr}) + t_{er}. \quad (6)$$

In Eq. (6), $\lambda$ denotes the number of valid pages in the victim block. Because $\lambda$ is unpredictable in each victim block, the execution time of each garbage collection task is variable. FIGS. 1A-1C illustrate an example of nondeterministic garbage collection. In FIG. 1A, the victim block 110 has four valid pages 111, 112, 115 and 118, and $\lambda$=4. All valid pages 111, 112, 115 and 118 in the victim block 110 are rewritten to another free block 120. The valid pages in the free block 120 are 121, 122, 123 and 124. FIG. 1B and FIG. 1C illustrate the different system response time due to the nondeterministic value of $\lambda$. According to some embodiments, $t_{wr}$, $t_{rd}$, and $t_{er}$ are 220 µs, 29 µs, and 2000 µs, respectively. When executing write task 132 ($T_{w2}$), the garbage collector triggers a garbage collection task 134(G) and the victim block has 12 valid pages ($\lambda$=12). As a result, to reclaim such a block takes 12×(29+220)+2000=4988 µs. For the reason that the write task 132 ($T_{w2}$) needs to wait for the completion of collection task 134 (G), the system response time for the write task 132 ($T_{w2}$) is R=220+4988=5208 µs. In FIG. 1C, if $\lambda$=2 in the victim block, the execution time of the garbage collection task is 2×(29+

220)+2000=2498 µs and the system response time is only R=2718 µs. As a result, λ causes unpredictable execution time of the garbage collection.

FIG. 2 is a diagram illustrating task scheduling in lazy-RTGC in accordance with some embodiments of the present disclosure. Given a data request task set $V_T=\{T_1, T_2, T_3, \ldots, T_n\}$ and the garbage collection task set $V_G=\{G_1, G_2, \ldots, G_m\}$ on system demand, it is desired to obtain a task schedule in which each data request can be executed within the upper bound $U(R_T)$ in the worst case, and the average system response time can be guaranteed with low space cost.

According to some embodiments, in the present implementation of lazy-RTGC, the physical flash space can be partitioned into three areas: the valid data area, the invalid data area, and the free area. According to some embodiments, the valid data area stores the latest data. When a data page is updated and the latest data is rewritten to another free page, the obsolete data belongs to the invalid data area. The free area contains free pages that can be utilized to store the updated data. For the reason that the lazy-RTGC adopts a page-level address mapping scheme, these three areas are not predefined to specified physical blocks or pages. As a result, the present implementation maximizes the space utilization. In NAND flash memory storage systems, the logical address space is normally smaller than the actual physical address space in the raw flash memory chip. According to some embodiments, this is because some physical blocks are utilized to manipulate the management of physical spaces in flash memory (e.g., translation blocks that store the address mapping tables, reserved blocks for bad block management, etc.). By taking advantage of these physical blocks, the size of the logical address space can help determine the lower bound of reclaimed free pages in the garbage collection.

In Lazy-RTGC, the page-level address mapping table is maintained in the RAM. Page-level address mapping can provide high performance of address translation and can effectively manage the flash space. For the reason that there is no fixed physical flash space, as the write buffer and the trigger condition are independent from the logical address of the coming requests, any free space in the flash can be considered as the write buffer. As a result, the lazy-RTGC delays the scheduling of garbage collection tasks as late as possible. According to some embodiments, the lazy-RTGC schedules garbage collection tasks only when the flash memory is close to be running out of space. For the reason that the garbage collection process is the most time-consuming operation in flash memory management, postponing the garbage collection reduces the overhead that may impact a single data request. According to some embodiments, postponing the garbage collection significantly improves the average system response time. Postponing the garbage collection, lazy-RTGC adopts the page-level mapping scheme to achieve real time performance and further provides advantageous average system performance in NAND flash memory storage systems.

According to some embodiments, there are two categories of tasks: the data request task (T) and the garbage collection task (G). The flash memory controller serves the data request task to execute the atomic read or write operation. The garbage collector generates partial garbage collection tasks when the number of free pages in the flash memory is below the predefined threshold. According to some embodiments, if there is no garbage collection task, the data request tasks are scheduled sequentially by coming order of the requests. Otherwise, the garbage collector first selects a victim block and then generates several partial non-periodic garbage collection tasks for reclaiming the victim block. Finally, the generated partial garbage collection tasks are scheduled to execute behind each write task one at a time until their executions are completed.

In order to hide the unpredictable service time of garbage collection, the partition of the garbage collection task is dependent on the entire garbage collection process of one victim block. According to some embodiments, a minimal deadline is defined for each garbage collection task. Each $G_j$ is executed within the deadline so that an upper bound of the worst system response time is provided. For the reason that the number of valid pages in the victim block is variable, one garbage collection task in previous schemes should be divided into several partial garbage collection tasks. According to some embodiments, each partial garbage collection task executes many atomic operations, such as valid page copies or block erase, until the total execution time reaches the minimal deadline. In addition, the block-erase operation, as the longest time cost operation, cannot be interrupted in the partial garbage collection task so that its execution time is the minimal deadline of each $G_j$. Therefore, the execution time of each garbage collection is guaranteed so that the worst system response time can be guaranteed as the minimal upper bound.

In Eq. (7) below, α is defined as the number of valid copies in each partial garbage collection task, which is a constant specified to the flash storage systems.

$$\alpha = \left\lceil \frac{t_{er}}{t_{rd}+t_{wr}} \right\rceil. \tag{7}$$

Lazy-RTGC does not schedule garbage collection tasks after the execution of read tasks, because read tasks do not consume free pages. As a result, lazy-RTGC will not affect the read performance.

The task scheduling of partial garbage collection tasks is presented in Algorithm 1. The inputs of the algorithm contain a set of data request tasks, a set of garbage collection tasks, the threshold of garbage collection, and the number of free pages in the flash. The output is a task schedule of the garbage collection tasks, each with guaranteed execution time. Algorithm 1 handles each data request task from the data request set one by one and removes the task from the set after it is executed. In line 2, the type of data request task is identified to decide the garbage collection task schedule.

According to some embodiments, Algorithm 1 is shown below. As shown in lines 2 to 6 in the Algorithm 1, if the current task is a write request and the garbage collection task set is not empty, it schedules one garbage collection task from the set and removes it once executed.

---

ALGORITHM 1: Task Scheduling of Partial Garbage Collection Tasks

Input: A set of data request task ($V_T = (T_1, T_2, ..., T_n)$), an empty set of garbage collection tasks ($V_G = \emptyset$), garbage collection threshold ($\rho_{th}$), and the number of free pages ($\Phi$).
Output: A task schedule.
1 for each $T_i \in V_T$ is executed do
2    if $T_i \in T_w$ then
3       if $V_G \neq \emptyset$ then
4          $r_{G_j} \leftarrow r_{T_i} + e_{T_i}$;
5          remove_gc_task($G_j$);
6       end
7       if $\Phi < \rho_{th}$ then
8          $PBN_{victim} \leftarrow$ get_victim_block( );
9          $V_G \leftarrow$ generate_gc_tasks($PBN_{victim}$);

```
ALGORITHM 1: Task Scheduling of Partial Garbage Collection Tasks 10            r_{G_j} ← r_{T_i} + e_{T_i};
11            remove_gc_task(G_j);
12        end
13    end
14 end
```

The response time of the garbage collection task is the total time of the execution time of the write data request and the upper bound of the garbage collection task execution time (i.e., the erase block time). According to some embodiments, as shown in lines 7 to 12 of the Algorithm 1, if the garbage collection task set is empty and the number of free pages is lower than the threshold, the present scheme picks up one victim block and generates garbage collection tasks from the victim block. These generated garbage collection tasks are pushed into the set, where the valid page copy tasks are sorted by their first copied valid page number and the erase task is the last task. According to some embodiments, the present scheme selects the first garbage collection task from the set and schedules it behind the data request task. In Algorithm 1, the present scheme schedules each data request task from the $V_T$ and schedules the garbage collection task from $V_G$ according to the type of data request task and the space usage of flash space. According to some embodiments, suppose there are N data request tasks in the set of $V_T$, the algorithm schedules all tasks one by one. As a result, the complexity of Algorithm 1 is O(N).

In order to avoid flash in the long-term worst case scenario, the lazy-RTGC is optimized by making use of system idle time. According to some embodiments, the lazy-RTGC schedules the partial garbage collection task in system idle time, even though the flash does not meet the worst case scenario. In order to reduce the impacts to average performance, the victim block with no valid pages is selected. And only schedule the partial garbage collection task after write tasks. As a result, Lazy-RTGC rarely meets the worst case and the system performance can be further improved.

FIG. 2 illustrates an example task schedule generated from Lazy-RTGC. Block 210 is the victim block, block 220 is the current data block, and block 230 is the free block. The victim block 210 includes valid pages 211, 212, 213, and 214. According to some embodiments, suppose there is a set of data request tasks $V_T=\{T_{w1}, T_{r2}, T_{w3}, T_{r4}, T_{w5}, T_{w6}\}$, where $T_{wi}$ represents the write task and $T_{ri}$ denotes the read task. Task 241 is $T_{w1}$, task 242 is $T_{r2}$, task 243 is $T_{w3}$, task 244 is $T_{r4}$, task 245 is $T_{w5}$, and task 246 is $T_{w6}$. According to some embodiments, garbage collection tasks include task 247 (G1), task 248 (G2), and task 249 (G3). When the flash storage system serves the request task 243 ($T_{w3}$), the garbage collector invokes garbage collection as the number of free pages is smaller than the predefined threshold. Suppose α=2, which means each garbage collection task can execute at most two atomic copies. Since the selected victim block 210 has 4 valid pages 211, 212, 213 and 214, the garbage collector generates 3 garbage collection tasks, Task 247 (G1) and task 248 (G2) for valid page copies and task 249 (G3) for victim block erase. The garbage collector reclaims free pages only after finishing the erase operation. Therefore $w_{G1}=0$, $w_{G2}=0$, and $w_{G3}$ is equal to -(8-4)=-4 (a negative value represents the reclaimed pages). Task 247 (G1) is released after task 243 ($T_{w3}$). Since the deadline of task 248 (G2) is $t_{er}$, the task 243 ($T_{w3}$) gives response to the file system within $R=t_{wr}+t_{er}$, which is the minimal upper bound of the worst system response time in a flash storage system. Task 248 (G2) is scheduled after task 245 ($T_{w5}$), which executes the same way as task 243 ($T_{w3}$). After the completion of task 249 (G3), the victim block 210 is erased and becomes a free block 230 that can be used to handle the coming tasks.

According to some embodiments, the system performance of the present scheme is discussed below. The present scheme is also compared with representative real-time schemes. Given that the worst case does not happen frequently, the average system response time is another important metric. According to some embodiments, focuses were given on providing an upper bound of service time in flash storage systems. According to some embodiments, the average system response time is ignored. As a result, such real-time schemes suffer significant performance degradation in spite of the fact that they guarantee the worst system performance.

The system response time in the worst case consists of the upper bound of a data request task and the deadline of a garbage collection task by using partial garbage collection. The free-space replenishment strategy in FSR does not guarantee the worst performance due to missing dependent real-time task information. GFTL, RFTL, and lazy-RTGC guarantee the worst case response time by adopting a partial garbage collection technique. Due to the address mapping scheme, the upper bounds of the three schemes are different. GFTL implements a block-level mapping scheme, where the logical page number is written into the OOB (out of band) area. There are extra OOB read operations within the process of handling data request tasks, which as a result, impacts the upper bound of the worst-case response time. RFTL uses a hybrid-level mapping scheme, and the mapping table is partially stored in the OOB area. As a result, there are OOB operations during address translation. According to some embodiments, the present scheme adopts a page level mapping scheme whose mapping table is maintained in the RAM, there are no extra OOB operations compared with GFTL and RFTL. As a result, lazy-RTGC provides the minimal upper bound of worst system response time.

Garbage collection introduces the largest overhead in NAND flash memory storage systems due to the valid page copies and block erasing. According to some embodiments, the present scheme does not need to specify flash space as the write buffer. According to some embodiments, due to the adoption of a page-level mapping scheme, any free space can be used as the write buffer. The threshold of garbage collection is only related to the rest of the physical free space. The garbage-collection-triggered time is postponed as late as possible in Lazy-RTGC. As a result, high average performance is achieved.

Compared to the present scheme, GFTL cannot provide good average performance. The main difference between GFTL and lazy-RTGC is that the present scheme can not only guarantee the worst-case response time, but also provide good average system performance. GFTL predefines a number of physical blocks as the write buffer and maintains a central garbage collection queue to decide which logical block is used for garbage collection. Once the primary block is full, the data should be written to the write buffer and invokes partial garbage collection for the primary block. The early garbage collection causes large amount of block erasing and valid page copying. As a result, GFTL suffers significant average system performance degradation.

RFTL pre-allocates three physical blocks to one logical block so that the execution of partial garbage collection is only related to the logical block. According to some embodiments, once the primary physical block of the corresponding logical block is full, even if there exists free space in many physical blocks belonging to other logical blocks, GFTL and RFTL all trigger garbage collection. As a result, the garbage collections in GFTL and RFTL are invoked very early and the space utilization may be very low under unbalance workloads. As a result, average system performance is degraded and the high number of block-erase counts indirectly impacts the endurance of the flash memory. According to some embodiments, the average performance and the space utilization are both important because the worst case does not happen with high frequency. According to some embodiments, the present scheme can not only provide an upper bound of execution time for each data request, but also provide better average performance and endurance compared to previous real-time flash schemes.

Table I shows the service guarantee bounds in different schemes.

TABLE I

Service Guarantee Bounds of Ideal Case [Ban 1995], FSR [Chang et al. 2004], GFTL [Choudhuri and Givargis 2008], RFTL [Qin et al. 2012], and Lazy-RTGC

| Bounds | $U(e_r)$ | $U(e_w)$ | $U(R_T)$ | $U(\lambda)$ | $U(\sigma)$ |
|---|---|---|---|---|---|
| Ideal | $t_{rdpg}$ | $t_{wrpg}$ | $t_{er}$ | $\pi$ | 0.99 |
| FSR | $t_{rdpg}$ | $t_{wrpg}$ | $U(e_T) + U(e_G)$ | $\sigma \times \pi$ | N/A |
| GFTL | $t_{rdpg} + \pi t_{rdoob}$ | $t_{wrpg}$ | $t_{er} + \max\{U(e_r), U(e_w)\}$ | $\pi$ | $1 - [(\kappa + 1]/2\pi$ |
| RFTL | $t_{rdpg} + t_{rdoob}$ | $t_{wrpg} + t_{rdoob}$ | $\max\{U(e_r), t_{er} + U(e_w)\}$ | $\pi$ | $1/3$ |
| Lazy-RTGC | $t_{rdpg}$ | $t_{wrpg}$ | $\max\{U(e_r), t_{er} + U(e_w)\}$ | $\sigma \times \pi$ | $[(\pi - 1)\alpha]/[(\alpha + 1)\pi]$ |

The symbols $t_{rdpg}$, $t_{wrpg}$, and $t_{rdoob}$ denote the execution of page reading, page writing, and OOB reading time, respectively. According to some embodiments, $\sigma$ is the ratio between logical and physical address space which used in the overprovisioning strategy. Through configuring $\sigma$, the reclaimed free space after each garbage collection is bounded. The upper bound of $\sigma$ (denoted as $U(\sigma)$) shows the maximum space utilization. According to some embodiments, a hypothetical ideal case is presented as the baseline, where a read or write request task can be executed directly without triggering any garbage collection. For the reason that the erase operation is the longest atomic operation in the flash and cannot be interrupted, the $U(R_T)$ in the ideal case is $t_{er}$. According to some embodiments, FSR is a representative scheme of a free-space replenishment strategy which can provide an upper bound of valid pages in the victim block (denoted as $U(\lambda)$). FSR cannot, however, provide the worst system response time and the upper bound of $\sigma$ due to missing real-time task information. According to some embodiments, the $U(R_T)$ is the theoretical worst-case value given in Eq. (5). GFTL schedules garbage collection tasks after the execution of a read or write task so that it impacts the read performance. According to some embodiments, the $U(\sigma)$ in GFTL is $1-[(\kappa+1)]/2\pi$, where $\kappa$ is the number of steps in partial garbage collection. For the reason that GFTL cannot guarantee the valid pages in a victim block, in the worst case, $\kappa = \lceil (\pi-1)t_{rdpg} + \pi t_{rdoob} \pi t_{wrpg} \rceil / t_{er} + 1$. RFTL and the present scheme only schedule garbage collection tasks after the completion of write tasks, as a result, there is no read performance degradation. The $U(\sigma)$ in RFTL is only $\frac{1}{3}$ due to fixed block pre-allocation and that in lazy-RTGC depends on the specification of flash.

The resource overhead in lazy-RTGC primarily comes from the RAM footprint and flash space. Due to the big page-level mapping table maintained in the RAM, Lazy-RTGC has large RAM-space consumption. For 1 GB flash space, Lazy-RTGC requires 2 MB RAM space to store the mapping table. According to some embodiments, several on-demand approaches have been proposed to solve this problem. The on-demand approaches can provide page-level mapping performance at the cost of RAM space similar to that of block level mapping schemes. In order to guarantee the number of reclaimed free pages after each garbage collection, the logical address space is configured smaller than the entire physical flash space. As a result, Lazy-RTGC has flash space overhead. According to some embodiments, the space utilization only depends on the specification of the flash. For mainstream SLC NAND flash memory, Lazy-RTGC can achieve 87.5% space utilization. By adopting a page level mapping scheme and partial garbage collection, the CPU resource consumption from address translation is close to that in the page-level mapping table. There are no further computing resource requirements in partial garbage collection, since it only defines the partial task start point and finish point. As a result, the CPU resource consumption is similar to the pure-page-level mapping scheme.

According to some embodiments, the bounds of the worst system response time of each data request task are analyzed. In the present task model discussed above, the entire process of garbage collection is divided into several partial garbage collection tasks, and each task G has the same deadline which is equal to the longest execution time of the atomic operations in the flash. According to some embodiments, $\lambda$ is used to represent the number of valid pages in the victim block and $N(V_G)$ is used to denote the total number of generated garbage collection tasks. According to some embodiments, define N(VG) as the following.

$$\mathcal{N}(V_G) = \left\lceil \frac{\lambda}{\alpha} \right\rceil + 1. \tag{8}$$

Based on Eq. (8), the following properties of partial garbage collection tasks can be obtained.

According to some embodiments, since the erase operation is the longest atomic operation in NAND flash memory storage systems, the deadline of each garbage collection task ($d_G$) is equal to $t_{er}$.

According to some embodiments, if $\lambda=0$, the number of generated garbage collection tasks is equal to 1, which is the minimal number. That is, $N(V_G)=1$. For the worst case, $\lambda=\pi-1$, where the victim block has the maximum number of valid pages, the number of generated garbage collection tasks also reaches the maximal value according to Eq. (8).

According to some embodiments, the garbage collector can generate a finite number of partial garbage collection tasks from any garbage collection. The size of the garbage collection task set ($N(V_G)$) has an upper bound which is only related to the specification of the NAND flash storage system.

According to some embodiments, since each block has a fixed number of pages in the flash memory, the number of valid pages in the victim block has an upper bound of π−1 (i.e., at least one invalid page). In addition, discussion above shows that $t_{er}$ is the longest atomic operation execution time. According to some embodiments, $t_{er}$ is the minimum value of deadline for each $G_j$. Since the garbage collector doesn't generate more partial garbage collection tasks until all previous tasks are scheduled, the upper bound of $N(V_G)$ can be obtained, which is only related to π and α. As a result, the upper bound of $N(V_G)$ is only affected by the specification of the NAND flash storage system.

According to some embodiments, for a data request task ($T_i$), in the worst case scenario, $T_{wi}$ is a write task and $V_G$ is not empty. Lazy-RTGC can schedule $T_i$ and $G_j$ so that $R_{Twi}$ can be guaranteed under a minimal upper bound. According to some embodiments, since $T_i$ and $G_j$ are dependent on each other, the worst system response time is the period between the start time of $T_i$ and the finishing time of $G_j$. According to the discussion above, each $G_j$ has a minimal deadline and the execution time of a write operation is the upper bound of $e_{Ti}$. Moreover, only one $G_j$ in the $V_G$ is scheduled to be executed behind $T_i$ at one time. The upper bound of the system response time is bounded by $e_{Tw}$ and $t_{er}$. Therefore they can be scheduled within the minimal upper bound of the system response time in the worst case.

In the present task models of the NAND flash storage system, the schedulability of data request tasks and garbage collection tasks are not only related to the guaranteed system response time, but also to the free space in the flash. That is, if there is no free space to allow the execution of write operations or atomic copies, tasks cannot be scheduled and executed successfully. According to some embodiments, the bounds of the space configuration are determined to promise the tasks' schedulability on the space level.

Since the entire garbage collection task is divided into several partial garbage collection tasks and each task is executed behind one write task at one time, our scheme in fact delays the reclaiming time. On the other hand, by making use of a page-level mapping scheme, our scheme can fully use each free page in the flash space, that is, each free block can handle data from both the atomic copies in the garbage collection tasks and the write data request tasks. Therefore our scheme can improve the space utilization.

According to some embodiments, if $N(V_G)=k$, the total free pages' cost on the dependent write tasks is $\Sigma_{i=1}^{k} w_{Ti}$, while the reclaimed free space after k partial garbage collection tasks is π−λ.

As discussed above, the space inter-dependency between data request tasks and garbage collection tasks is observed. That is, garbage collection tasks depend on data request tasks to be scheduled, while at the same time data request tasks depend on the reclaimed free space from the garbage collection tasks to be executed. As a result, a producer and consumer problem is formed, where the garbage collection task is a producer to reclaim the free space while the data request task is a consumer to cost the reclaimed free space. When there is no free space in the flash, the data request task cannot be executed. As a result, the corresponding garbage collection task cannot be scheduled either. In addition, there is no reclaimed free space due to the failed scheduling of the garbage collection task. As a result, the flash memory does not have free space and no write task or garbage collection task can be scheduled. In order to protect the task scheduling from such deadlocks, the following equation is needed:

$$\sum_{i=1}^{k} w_{T_{wi}} \leq \sum_{j=1}^{k} (-w_{G_j}) \quad (9)$$

$$k \leq (\pi - \lambda)$$

Since $w_{Tw}$ is equal to 1 for each write task, $\Sigma_{j=1}^{k} -wT_{wi}$ is equal to k and has an upper bound. According to some embodiments, $\Sigma_{j=1}^{k} -wG_t$ is the number of reclaimed free pages of one victim block, which is equal to (π−λ). According to some embodiments, due to the unpredictable λ in each victim block, flash memory cannot give a bound of reclaimed free space. According to some embodiments, a strategy is adopted which limits the logical space address to guarantee the number of valid pages in each block.

According to some embodiments, suppose the total number of data pages is denoted as Θ and the number of logical pages is bounded by Λ. If the garbage collector adopts a greedy policy to select a victim block, the number of valid pages in the victim block can be guaranteed to an upper bound (denoted as U(λ)). That is $$U(\lambda) = \left\lceil \frac{\Lambda}{G} \times \pi \right\rceil.$$

According to some embodiments, the garbage collector adopts a greedy policy to select that victim block with the least number of valid pages. Assume a victim block is picked out with λ=U(λ)+1 valid pages and the flash space is fully used. As a result, other blocks have at least λ valid pages. Suppose there are N data blocks and Θ=π×N, Λ=λ′N=(Λ× π×N)/Θ+N=Λ+N. According to some embodiments, the number of logical pages contradicts the assumption discussed above. As a result, U(λ) is the upper bound of the number of valid pages in the victim block.

As discussed above, an upper bound of valid pages in each victim block is given, the value of (π−λ) can also provide a lower bound of the number of invalid pages. According to some embodiments, the garbage collection tasks can be scheduled to execute after write tasks when and only when the lower bound of reclaimed space is greater than or equal to the upper bound of space requirement of dependent write tasks. That is, after scheduling partial garbage collection tasks in the $V_G$, the flash memory has enough reclaimed free space to schedule newly generated garbage collection tasks in the future.

According to some embodiments, according to Eq. (9), k is the free page cost of the write tasks with the scheduled garbage collection tasks. As discussed above, it is shown that $N(V_G)$ has an upper bound. On the other hand, it is proven that the number of reclaimed free pages in each victim block has a lower bound in the present scheme. If the upper bound of $N(V_G)$ is always lower than the lower bound of the reclaimed free space, it leads to that there always exists enough space for scheduling data request tasks with garbage collection tasks.

For the reason that the logical address space is limited to lower than the total flash space, the present scheme has a trade-off of flash space compared to conventional schemes. In order to reduce such space overheads to the greatest extend possible, set k to be equal to the lower bound of the reclaimed space. Then, the following equation is obtained by combining Eqs. (6) and (9):

$$\lambda \le \left\lceil \frac{(\pi-1)\alpha}{\alpha+1} \right\rceil. \quad (10)$$

In order to simplify the representation, σ is used to denote the ratio between the logical address space and the total physical space (i.e., physical-space utilization). As a result, the upper bound of λ discussed above can be represented ⌈σ×π⌉. In addition, the following equation of the space configuration parameter of σ can be obtained:

$$\sigma \le \frac{(\pi-1)\alpha}{(\alpha+1)\pi}. \quad (11)$$

As a result, σ is only related to the specification parameters (α and π) of the flash memory. In addition, the relation between k and σ is obtained by combining Eqs. (10) and (11).

$$k \le \max\left\{\left\lceil \frac{\sigma\pi}{\alpha+1} \right\rceil, \lceil(1-\sigma)\pi\rceil\right\}. \quad (12)$$

In order to delay scheduling garbage collection tasks to the greatest extent possible, the minimal threshold of starting to generate and schedule the partial garbage collection task is defined. The following equation is given to define the garbage collection threshold (denoted as $\rho_{th}$). That is, write tasks can be executed without scheduled partial garbage collection tasks until the free space is under the $\rho_{th}$. According to some embodiments, U(k) and U(λ) represent the upper bound of free page costs and valid page copies during the garbage collection tasks, respectively.

$$\rho_{th} = U(k) + U(\lambda). \quad (13)$$

For the reason that the space configuration of Lazy-RTGC is only related to α and π, six representative flash memory chips are selected to show the relationship between the space utilization and the specification. According to some embodiments, Table II shows the parameters of different NAND flash chips:

TABLE II

Space Configurations in Different Flash Memory Chips

| NAND Flash | $t_{rd}$(µs) | $t_{wr}$(µs) | $t_{er}$(µs) | π | U(σ) |
|---|---|---|---|---|---|
| Spansion 512 MB SLC NAND Flash [Spansion 2013] | 25 | 200 | 2000 | 64 | 0.875 |
| Toshiba 512 MB SLC NAND Flash [Toshiba 2012] | 25 | 300 | 3000 | 64 | 0.886 |
| Samsung 512 MB MLC NAND Flash [Samsung 2007] | 60 | 800 | 1500 | 128 | 0.496 |
| Micron 16 GB MLC NAND Flash [Micron 2012] | 50 | 1600 | 5500 | 256 | 0.747 |
| Toshiba 2 GB TLC NAND Flash [Toshiba 2008] | 250 | 2700 | 4000 | 192 | 0.497 |

According to some embodiments, Table III presents the space utilization for different schemes using the parameters in Table II:

TABLE III

Space Utilization Comparison

| NAND Flash | Ideal | FSR | RFTL | GFTL | Lazy-RTGC |
|---|---|---|---|---|---|
| Spansion 512 MB SLC NAND Flash [Spansion 2013] | 99% | N/A | 33.3% | 92.9% | 87.5% |
| Toshiba 512 MB SLC NAND Flash [Toshiba 2012] | | | | 92.9% | 88.6% |
| Samsung 512 MB MLC NAND Flash [Samsung 2007] | | | | 68.8% | 49.6% |
| Micron 16 GB MLC NAND Flash [Micron 2012] | | | | 84.2% | 74.7% |
| Toshiba 2 GB TLC NAND Flash [Toshiba 2008] | | | | 59.6% | 49.7% |

NAND flash design can be categorized into SLC (single level cell), MLC (multilevel cell), and TLC (triple-level cell) flash memory. SLC flash stores one bit value per cell, which can provide faster write performance and greater reliability. An MLC and a TLC cell can represent multiple values so as to provide high storage capacity with performance and reliability degradation. According to some embodiments, lazy-RTGC can achieve around 87% space utilization in SLC NAND flash and meet the worst space utilization (about 49.6%) in Samsung 512 MB MLC NAND flash. According to some embodiments, the space utilization is decided by the ratio between the sum of $t_{rd}$ and $t_{wr}$ and $t_{er}$. For the reason that the ratio is only 1 in Samsung MLC NAND flash, that is, each partial task can copy only one data page, Lazy-RTGC reaches the worst space utilization, which is about half of the entire flash. GFTL has better space utilization compared to the present scheme, but suffers performance degradation. Since RFTL pre-allocates three physical blocks to one logical block, its space utilization is about 33.3%, not related to specification of flash. The space utilization of FSR is decided by the real-time task information so that it does not have a fixed upper bound. The ideal scheme has the highest space utilization since it uses the pure-page-level mapping scheme without considering real-time properties. TLC NAND flash memory has high storage capacity but its performance is poor. GFTL and our scheme have low space utilization on a TLC NAND flash memory specification. From the theoretical value comparison, lazy-RTGC shows better space utilization in SLC NAND flash than those in MLC and TLC NAND flash. In addition, SLC NAND flash has good reliability and endurance so is more suitable to real-time embedded systems. Therefore lazy-RTGC can be applied on SLC NAND flash for real-time systems.

FIG. 3 is a diagram illustrating lazy-RTGC for DFTL in accordance with some embodiments of the present disclosure. The upper bound of N(VG) is only affected by the specification of the NAND flash storage system. Page-level address mapping in lazy-RTGC can improve the average system performance by postponing garbage collection operations as late as possible. The big address mapping table, however, costs large RAM space, which is not suitable for resource-constrained embedded systems. Block 310 is the free data block, and block 320 is the free translation block.

According to some embodiments, in order to solve the big RAM cost in page-level mapping, on-demand approaches are implemented. According to some embodiments, DFTL is selected to introduce how to the lazy-RTGC scheme to on-demand page-level mapping. DFTL is a representative on-demand scheme.

In DFTL, there are two types of blocks: data blocks and translation blocks. The entire page-level mapping table is stored in translation blocks. Each translation page stores multiple consecutive mapping items from a fixed starting logical address. Frequently used mapping items are cached in a cached mapping table (CMT) in the RAM and there is a global translation directory (GTD) to track the translation pages in flash. The performance of DFTL is close to those of pure-page-level schemes, while the RAM space it requires is close to those of block-level mapping schemes. As a result, DFTL can be applied to resource-constrained embedded systems. By introducing translation blocks and CMT, it is more difficult to jointly optimize its worst-case response time and average response time.

Compared to pure-page-level address mapping schemes, DFTL triggers extra translation page operations in NAND flash. In particular, in the worst case scenario, one write request incurs two extra read operations and one extra write operation. The reason is as follows: first, one translation page needs to be read in order to get the corresponding address mapping of the write request if the mapping information can not be found from CMT; second, by caching the new address mapping information into CMT, it may cause an eviction operation that will introduce one read and one write operation in order to write the updated mapping item back to the translation page. Similarly, in the worst case scenario, one read request also incurs two extra read operations and one write operation.

In order to jointly optimize the average and worst-case performance of DFTL, lazy-RTGC is applied to manage both the cached mapping table and translation blocks. To make the present scheme easily extended to other on-demand page-level schemes, the data structures of DFTL is not modified. The present scheme includes three tasks, namely the data-block partial garbage collection task (denoted as $D_G$), the translation-block partial garbage collection task (denoted as $T_G$), and the translation page write back task (denoted as $T_W$). According to some embodiments, $D_G$ manages partial garbage collection for data blocks, $T_G$ manages partial garbage collection for translation blocks, and $T_W$ writes several translation pages back to translation blocks by grouping all corresponding mapping items in CMT together so as to reduce the size of CMT. According to some embodiments, the following two conditions in the worst-case scenario needs to be guaranteed. (1) A predefined number of free pages in data blocks and a predefined number of free pages in translation blocks (both of the numbers are not larger than $\pi$) are good enough to hold all write requests during execution of the aforesaid three tasks. (2) After the three tasks have been finished, one new free data block and one new free translation block are generated so there is always enough space for garbage collection, even in the worst-case scenario.

FIG. 3 shows an example in which a data block and a translation block are used to provide free pages that can hold all write requests for data and translation pages, respectively, when the three tasks are executed. According to some embodiments, similar to lazy-RTGC, $D_G$, $T_G$, and $T_W$ are all executed in partial garbage collection manner in which each is divided into partial tasks that are scheduled to interleave with tasks that serve read/write requests (see FIG. 4 for an example). In $T_G$, lazy-RTGC is applied in garbage collection for translation blocks, in which a garbage collection operation is divided into a partial task for copying valid translation pages and one for erasing the victim translation block. In addition, the overprovisioning strategy is also applied in translation blocks. By configuring the space ratio of translation blocks, the maximum number of valid translation pages in a victim translation block can be guaranteed so the number of partial tasks of $T_G$ can be bounded. In $D_G$, in order to reduce extra update operations for translation pages, for both write request and valid page copy, all address mappings are cached into CMT. Accordingly, $T_W$ is used to reduce the size of CMT by grouping related mapping items into their corresponding translation pages and writing back to translation blocks. Similar to partial garbage collection tasks, the upper bound of the execution time of $T_W$ is $t_{er}$ and each $T_W$ task can update $\alpha$ translation pages. According to some embodiments, $D_G$, $T_G$, and $T_W$ are independently invoked based on their own thresholds. When all or any two of them are triggered at the same time, the precedence order is $D_G > T_G > T_W$.

According to some embodiments, the worst-case scenario occurs when $D_G$, $T_G$, and $T_W$ all reach their thresholds at the same time. Based on the preceding precedence order, $D_G$ is first scheduled to be executed. Since all related address mapping information will be cached in CMT, $D_G$ will not introduce any updates for translation pages. Next, $T_G$ will be scheduled to be executed after $D_G$ has finished. In $T_G$, as data blocks and translation blocks are separated, valid translation pages from a victim translation block will be copied to another translation block. Thus $T_G$ itself does not require data pages. However, free pages from data blocks are still needed to serve write requests during the execution of $T_G$, because partial tasks of $T_G$ are interleaved with tasks to serve read/write requests. Finally, $T_W$ is scheduled to write address mapping items back to translation pages in a batch manner. The number of $T_W$ tasks is decided by the size of CMT and the thresholds of $D_G$ and $T_G$, which is discussed in detail below. Free pages required by the three tasks can be provided as shown in FIG. 3. According to some embodiments, $D_G$ requires $\lambda_d$ data pages for valid page copies while $k_d$ data pages are used to serve write requests that are interleaving with the partial tasks of $D_G$. In addition, $T_G$ requires $\lambda_t$ translation pages for valid translation page copies in translation blocks, and $k_t$ data pages provide the space for write requests interleaving with the partial tasks of $T_G$. Then TW writes $\lambda_w$ translation pages back while $k_w$ data pages are used for write requests. According to some embodiments, based on the overprovisioning strategy, it can be guaranteed that $k_t + k_d + \lambda_d + k_w \leq \pi$ and $\lambda_t + \lambda_w \leq \pi$, accordingly the present scheme works in the worst-case scenario.

FIG. 4 is a diagram illustrating the mechanism of lazy-RTGC for DFTL in accordance with some embodiments of the present disclosure. Suppose each block has eight pages and each partial garbage collection task can copy at most three valid pages. The block 410 is a victim data block, the block 420 is a current data block, the block 430 is a first victim translation block, the block 440 is a second current translation block, block 450 is a first free block, the block 460 is a second free block, the table 470 is a cached mapping table. When there is only one free data block, the garbage collection of the data block is triggered. $D_{G1}$ and $D_{G2}$ are scheduled after task 481 ($T_{w1}$) and task 482 ($T_{w2}$), respectively, to copy the valid data pages and erase the block. During the garbage collection, the updated address mapping items from valid page copies and write requests are cached in CMT. After the data block garbage collection, because CMT is close to full and the translation block has not reached the threshold, Lazy-RTGC generates a TW task 490

(write back TP19 and TP45) that is executed after task 484 ($T_{w4}$) to write back the corresponding updated mappings to the current translation block. Then, after task 484 ($T_{w4}$) and TW, the number of free pages in the translation block is smaller than the threshold. This will trigger translation-block garbage collection. After executing task 485 ($T_{w5}$) to write to PPN30, task 491 ($T_{G1}$) is scheduled to copy three translation pages (TP11, TP18, and TP14) to the current translation block. Then, in task 489 ($T_{G2}$), the victim translation block is erased after task 487 ($T_{w7}$) that serves a write request. As a result, one new free data block and one new free translation block are reclaimed.

Lazy-RTGC for DFTL includes two kinds of garbage collection operations: data-block garbage collection and translation-block garbage collection. The present scheme only schedules one kind of garbage collection operation at a time. After a victim data block is erased, the remaining free pages are implemented to schedule the write back tasks and partial garbage collection tasks on translation blocks. In addition, the present scheme caches the updated mapping items in CMT during the garbage collection so that it does not incur translation page updates. According to some embodiments, in the worst case scenario, there is a cache miss to handle a write request. Accordingly, there is an extra read translation page operation to locate the address mapping information. As a result, the worst-case response time is as shown in Eq. (14).

$$U(R_T)=\max\{U(e_r),t_{er}+U(e_w+e_r)\}. \quad (14)$$

According to some embodiments, since the entire mapping table is stored in the translation blocks, the operations on the mapping item between the cache and translation blocks incur extra overhead. For the worst case scenario of DFTL, there are extra two translation page read operations and one translation page write operation attaching to one data page write request due to cache replacement. The upper bound of each data task without triggering garbage collection is presented in Eq. (15).

$$U(R_{avg})=2\times(t_{wr}+t_{rd}). \quad (15)$$

According to some embodiments, to provide enough free space for scheduling two kinds of partial garbage collection operations, the overprovisioning strategy is applied for both data blocks and translation blocks. According to some embodiments, $N_d$ is defined as the number of physical data blocks and $N_t$ as the number of translation blocks. According to some embodiments, let $\sigma_d$ be the ratio between the logical address space and $N_d$, where $\sigma_t$ is represented as the ratio between $N_t$ and predefined physical space for the translation block. According to some embodiments, $\sigma_d$ decides the number of reclaimed data pages and $\sigma_t$ is used for getting the upper bound of the valid translation page copies. According to some embodiments, $\Lambda_d$ and $\lambda_t$ represent the guaranteed number of valid pages in the victim data block and translation block, respectively.

According to some embodiments, with demand-based approaches, translation blocks will occupy some flash space. If the size of each page is 2 KB and the RAM cost for each page-level mapping item is 4 bytes, then the physical space overhead is 1/512 (about 0.2%) of the entire space. The logical address space $\Lambda_d$ is decided by $\lceil \sigma \times N_d \rceil$ and the corresponding number of translation blocks is $\lceil \Lambda_t = \Lambda_d/512 \rceil$. To guarantee the number of valid translation page copies, the overprovisioning strategy is applied to translation blocks, that is, $N_t = \sigma_t \times \Lambda_t$. According to some embodiments, N is the total number of physical blocks in flash, $N=N_d+N_t$. To reclaim the free space for translation-block garbage collection, the value of k and the number of partial garbage collection tasks for the data block and translation block are defined as follows.

$$k_d + k_t \le (\pi - \lambda) \quad (16)$$

$$N(V_{G_d}) = \left\lceil \frac{\lambda_d}{\alpha} \right\rceil + 1; N(V_{G_t}) \left\lceil \frac{\lambda_t}{\alpha} \right\rceil + 1$$

According to some embodiments, the garbage collection of translation blocks does not require free data pages, instead, only requires translation pages. As a result, only $k_t$ extra free data pages are needed to serve write requests that are interleaving with the partial tasks in a translation-block garbage collection task. According to the prior equations, the space configuration under on-demand page-level mapping can be obtained in Eq. (17).

$$\sigma_d \le \frac{(\pi-2)\alpha - \lambda_t}{(\alpha+1)\pi} \quad (17)$$

$$\lambda_t \le \sigma_t \times \pi.$$

According to some embodiments, $\tau_t$ can be configured to a small value since the entire space for translation blocks is small. Then σd can be decided by the flash specification of α, π, and the configured $\sigma_t$. According to some embodiments, in the experiments, the space utilization ratio of Lazy-RTGC for DFTL is about 80%.

According to some embodiments, we cache address mappings are cached to CMT during the garbage collection. In the worst case scenario, data write requests and valid data copies all cause cache misses so that π mapping items may be added to CMT. Each write-back task updates α translation pages and each translation-block garbage collection updates at least $\lambda_t$ translation pages. As a result, the number of TW tasks is $(\pi-\lambda_d-k_d-k_t)$, which represents the number of free pages not scheduled for partial garbage collection in the last free data block. According to some embodiments, the total number of updated translation pages (denoted as γ) from TW tasks and TG tasks is calculated in the following equation:

$$L(\gamma)=(\pi-2)\alpha-(\alpha+1)\sigma_d\times\pi. \quad (18)$$

According to some embodiments, in Eq. (18), $\sigma_d$ is the space configuration parameter for overprovisioning, and α and π are only related to the flash specification. In the worst case scenario, π cached mapping items are all from different translation pages. In order to balance the number of increased π mapping items and the γ write-back translation pages, each updated translation page should have at least π/γ mapping items from CMT. According to some embodiments, $N_t$ is defined as the number of all valid translation pages in the flash, which is decided by the logical address space. According to some embodiments, an upper bound of the CMT size is obtained as the following:

$$L_{cmt} \le \frac{\pi}{\gamma} \times N_t. \quad (19)$$

FIG. 5 is a functional diagram illustrating the framework of simulation platform in accordance with some embodiments of the present disclosure. According to some embodiments, the framework of the simulation platform is based on Disksim which is a well-regarded disk-drive simulator. FlashSim is implemented as a module of Disksim, which is used to manage and supply basic operations of a flash memory chip. The module 510 contains flash model with configured parameters, the module 511 is a SPC module, the module 512 is a DiskMon module, and the module 513 contains traces. The module 520 contains DiskSim framework, which further include a sub module 521, which is the FlashSim sub module. The FlashSim sub module 521 further includes sub unit 522 which contains implementation of flash translation layer, and sub-unit 523 which includes MTD simulator. The module 530 contains results. According to some embodiments, the FlashSim framework is adopted because it is a widely used simulation platform to evaluate the performance of FTL schemes. In the simulation framework, in addition to the present scheme, FSR, GFTL, RFTL, and the Pure-Page-Level mapping schemes are also implemented. In addition, the present scheme is implemented on a demand-based page-level mapping scheme (called on-demand Lazy-RTGC) to reduce RAM cost. FSR is a representative scheme that can guarantee the reclaimed free space. FSR cannot, however, satisfy real time requirements. GFTL and RFTL are representative schemes adopting the partial garbage collection technique. The Pure-Page-Level scheme is the page-level address mapping scheme without applying any real-time mechanisms. According to some embodiments, a 32 GB NAND flash memory is configured and the parameters are shown in Table IV.

TABLE IV

Parameters of the NAND Flash Memory

| Parameter | Value |
| --- | --- |
| Total capacity | 32 GB |
| The number of planes in the chip | 8 |
| The number of blocks per plane | 2048 |
| The number of pages per block | 64 |
| Page size | 2 KB |
| Page read latency | 29.0 µs |
| OOB read latency | 29.0 µs |
| Page write latency | 220.9 µs |
| Block erase latency | 2000.0 µs |

According to some embodiments, a set of benchmarks from both real-world and synthetic traces are implemented to study the performance of different schemes. The traces used in the simulation are summarized in Table V.

TABLE V

Traces Used in the Simulation

| Traces | Number of Requests | Write (%) | Average Request Size (KB) |
| --- | --- | --- | --- |
| Websearch | 1,055,448 | 0.02 | 15.05 |
| Financial | 3,698,864 | 17.66 | 5.24 |
| Copy File | 670,412 | 71.89 | 42.30 |
| Download File | 1,730,415 | 67.21 | 41.10 |
| Play Video | 875,928 | 63.44 | 47.75 |

According to some embodiments, Websearch is a read-dominant I/O trace obtained from Storage Performance Council (SPC), which has a large number of read operations. A majority of the read operations in Websearch are random data requests. Financial is an I/O trace with high sequential accesses from an OLTP application running at a financial institution. The logical address space in Financial is far smaller than the physical space of the simulated NAND flash. Copy File is a trace collected when copying files from one location to another. Copy File consists of a high ratio of write request tasks, including many sequential read and write operations. Download File is collected when downloading files from the network. Download File is also a write-dominant trace. Compared to the trace Copy File, it has more sequential write operations with a large number of requests. Play Video is collected under a hybrid workload of playing an online video in which the video player is reading the video data and, at the same time, downloading the data from the network. The traces of Play Video contain many random read and write operations. According to some embodiments, these three traces are collected from a desktop running Diskmon with Windows XP on an NTFS file system. In order to make a fair comparison, performance data is collected after the first garbage collection is triggered. According to some embodiments, there is a warm-up process that writes the data into the NAND flash before the simulation starts so that all read requests can read data from the simulator. Compared to Pure-Page-Level, Lazy-RTGC adopts a different policy to trigger garbage collection. For Pure-Page-Level, the garbage collection can be delayed as late as possible. Since it does not use the overprovisioning strategy, the entire physical address space is mapped to the logical address space. Only one extra swap block is used as the buffer to hold the valid page copies during garbage collection. When there is no free data page in NAND flash memory, Pure-Page-Level triggers garbage collection operations to copy free pages to swap blocks and to reclaim free pages. According to some embodiments, FSR adopts the overprovisioning strategy where the logical address space is smaller than the physical space. The trigger condition in FSR is similar to that in Pure-Page-Level. According to some embodiments, GFTL and RFTL adopt a block-level and a hybrid-level mapping scheme, respectively. When the primary block for the corresponding logical block is full, garbage collection is triggered. Therefore, the trigger condition for these two schemes depends on the logical address of the coming data task. In Lazy-RTGC, by adopting a page-level mapping scheme, the garbage collection trigger time is delayed as late as possible compared to GFTL and RFTL. When there is only one free block in flash, partial garbage collection is triggered in the present scheme. According to some embodiments, in all schemes, every garbage collection process reclaims one victim block when garbage collection is finished in the experiment.

Figures 6A, 6B, 6C, 6D, 6E, 6F:
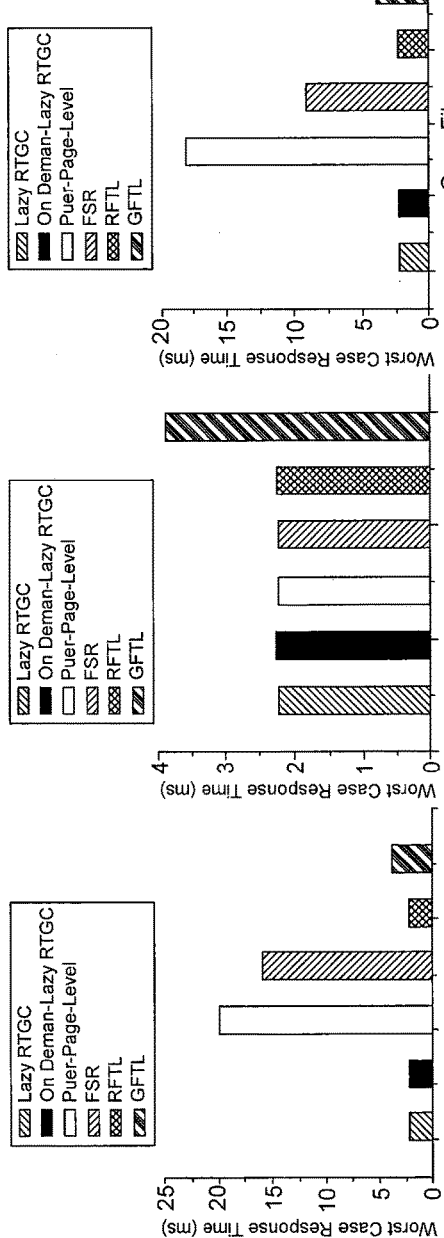
FIGS. 6(a) through 6(e) are bar charts comparing the worst case response time of Lazy-RTGC with the worst case response time of on-demand lazy-RTGC, pure-page-level, FSR, RFTL and GFTL for web search, financial, copy file, download file, and play video applications.
FIG. 6(f) is a bar chart of the average worst case response time in accordance with some embodiments of the present disclosure.

FIGS. 6($a$) through 6($e$) are bar charts comparing the worst case response time of Lazy-RTGC with the worst case response time of on-demand lazy-RTGC, pure-page-level, FSR, RFTL and GFTL for web search, financial, copy file, download file, and play video applications, FIG. 6($f$) is a bar chart of the average worst case response time in accordance with some embodiments of the present disclosure. The main objective of the present scheme is to provide an upper bound of system response time. The experimental results are shown in FIGS. 6($a$)-6($f$). The upper bound of worst-case response time in Pure-Page-Level is defined by above, that is, the garbage collection process needs to copy $\pi-1$ valid pages. In addition, due to the shortage of free pages, one data task may trigger multiple garbage collection operations. Therefore Pure-Page-Level may suffer bad worst-case response time. According to some embodiments, FSR can guarantee the number of reclaimed free pages but cannot guarantee the worst case response time due to missing information of real-time tasks. For the reason that the present scheme adopts page-level address mapping and the mapping table is maintained in RAM, there is no OOB operation compared with GFTL and RFTL. As a result, the present scheme can achieve the minimal upper bound of worst system response time. That is, $U(R_t)=t_{wrpg}+t_{er}=2,220.9$ µs. According to some embodiments, GFTL needs at most π OOB read operations to locate the page. According to some embodiments, GFTL reached this state in all traces so that the real upper bound is $U(T)=t_{rd}+\pi t_{rdoob}+t_{er}=3,885$ µs. As a result, the present scheme can achieve a 42.83% reduction on the upper bound of worst system response time compared to GFTL. According to some embodiments, even better performance (i.e., reduced one OOB read operation) compared to RFTL can be achieved. As shown in FIG. 6, the present scheme can achieve 90.58% and 83.78% reductions on worst system response time compared with Pure-Page-Level and the FSR scheme, respectively.

According to some embodiments, in the on-demand Lazy-RTGC scheme, the updated mapping items from data requests and valid page copies in the CMT are cached so as not to introduce any translation page operations during partial garbage collection. After garbage collection, write back tasks are scheduled to reduce the CMT size. For a single data request, it may need to read mapping information from the translation page in flash memory. As a result, the worst-case response time is slightly more than that in Lazy-RTGC.

FIGS. 7(a) through 7(e) are bar charts comparing the average response time of Lazy-RTGC with the average response time of on-demand lazy-RTGC, pure-page-level, FSR, RFTL and GFTL for web search, financial, copy file, download file, and play video applications, FIG. 7(f) is a bar chart of the average of average response time in accordance with some embodiments of the present disclosure. According to some embodiments, given that the worst case does not happen frequently, the average system response time is one of the most important metrics to represent system performance. The experimental results are shown in FIG. 7. From the results, it is observed that GFTL and RFTL suffer significant performance degradation compared with Pure-Page-Level and our scheme. The present scheme can achieve 94.56% and 50.84% improvements on average system response time compared to GFTL and RFTL, respectively. Since the present scheme adopts a page-level address mapping scheme that can freely manage the data pages in the flash memory and sufficiently make use of the flash space, the present scheme can achieve better average system response time. According to some embodiments, compared to the present scheme, GFTL adopts a block-level mapping scheme, and once some logical block is fully used; the corresponding physical block is added to the central garbage collection queue to do partial garbage collection. As a result, there are a large number of unnecessary garbage collections which are triggered very early. RFTL pre-allocates three physical blocks to each logical block. When the logical block is full, partial garbage collection is triggered within the allocated blocks. As a result RFTL still triggers garbage collection early and requires lots of extra physical flash space. Compared to FSR and Pure-Page-Level that cannot guarantee real-time performance, the present scheme can achieve similar average system performance.

Figure 8B:
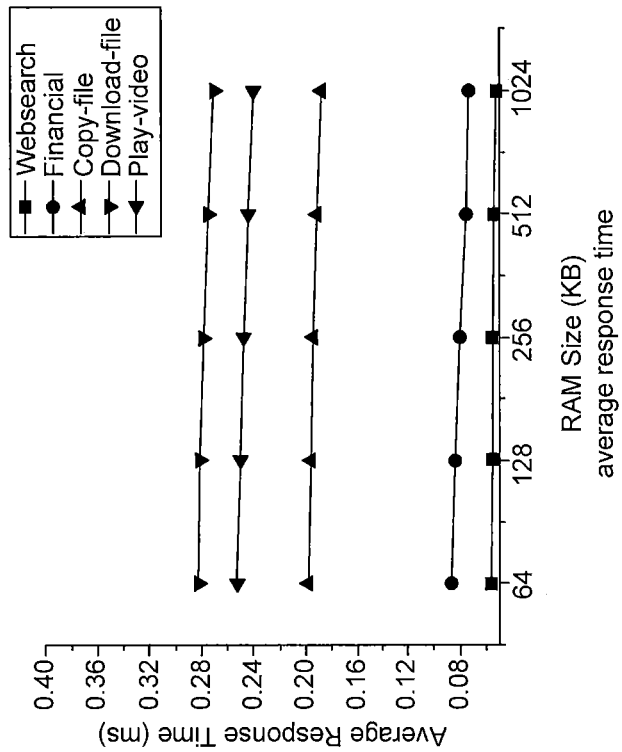
FIG. 8B is a graph comparing the average response time for on-demand lazy-RTGC with different RAM size configurations in accordance with some embodiments of the present disclosure.
Figure 8A:
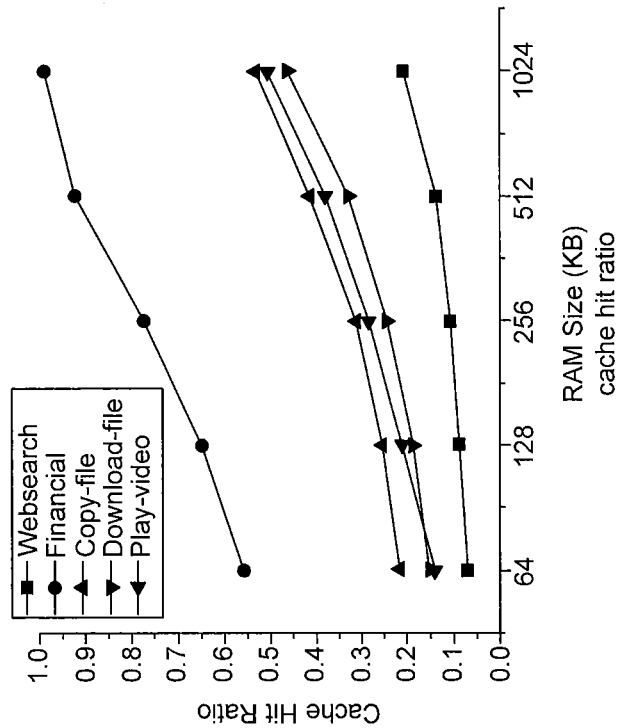
FIG. 8A is a graph comparing the cache hit ratio for on-demand lazy-RTGC with different RAM size configurations in accordance with some embodiments of the present disclosure.

FIG. 8A is a graph comparing the cache hit ratio for on-demand lazy-RTGC with different RAM size configurations in accordance with some embodiments of the present disclosure. FIG. 8B is a graph comparing the average response time for on-demand lazy-RTGC with different RAM size configurations in accordance with some embodiments of the present disclosure. In Lazy-RTGC, the logical address space is smaller than the physical. When garbage collection operations are triggered, the number of valid page copy operations can be guaranteed. Pure-Page-Level does not adopt the overprovisioning strategy, that is, the entire physical address space is mapped to logical address space. Only one block is used as the log buffer to hold valid page copies. Therefore, they may meet worst case when flash memory is fully utilized and few free pages can be reclaimed. As a result, the continuous garbage collection operations degrade the average performance in Pure-Page-Level. As shown in FIG. 9, the average number of valid page copies during garbage collection in the present scheme is smaller than that in Pure-Page-Level. As a result more free pages are reclaimed after garbage collection, which can further postpone the next garbage collection triggering time. As a result, compared to Pure-Page-Level, the number of block-erase counts is also reduced in the present scheme. According to some embodiments, the present scheme has similar or even better average performance compared to Pure-Page-Level because of its smaller valid page copies and block-erase counts. In On-demand Lazy-RTGC, as shown in FIG. 8, the average response time is evaluated with different RAM cache sizes. FIG. 8A presents the cache hit ratio with different RAM sizes over different benchmarks. Benchmark Web Search has a large number of random read requests; as a result the hit ratio is below 20%. For benchmark Financial, the logical address space is small and contains a large number of sequential data requests. Therefore the hit ratio can achieve more than 50%. By making use of write back tasks, for On-demand Lazy-RTGC, most cached mapping items can be written back to flash memory in a batch way. From the results in FIG. 8B, it is observed that the average response time with 1024 KB RAM size over different benchmarks can achieve an average 7.50% improvement than that with 64 KB RAM size. According to some embodiments, this is due to the fact that, with increase in RAM size, the number of translation page operations is reduced, and the worst-case response time is bounded. In order to make a fair comparison, for other performance metrics, 256 KB is selected as the CMT size in the experiments.

FIGS. 9(a) through 9(e) are bar charts comparing the normalized number of valid page copies of lazy-RTGC with the normalized number of valid page copies of on-demand lazy-RTGC, pure-page-level, FSR, RFTL and GFTL for web search, financial, copy file, download file, and play video applications, FIG. 9(f) is a bar chart of the average of the normalized number of valid page copies in accordance with some embodiments of the present disclosure. The number of valid page copies in garbage collection impacts the time consumption of the garbage collection process. By making use of a page level address mapping scheme, Lazy-RTGC can fully use the free pages in the flash and trigger garbage collection as late as possible. In addition, the logical address space is configured lower than the entire physical flash space. As a result, there are more invalid pages in victim blocks when the flash memory is almost full. In order to reclaim enough free space to do both data garbage collection and translation-block garbage collection in On-demand Lazy-RTGC, the space utilization is lower than that in Lazy-RTGC. According to some embodiments, for Web Search, due to the cache replacement, 56.26% valid page copies are from translation pages. In other traces, about 3.98% valid page copies are translation page copies. By applying the overprovisioning strategy on translation blocks, there are few valid page copies in translation-block garbage collections. According to some embodiments, GFTL and RFTL adopt a block-level scheme so that the condition to trigger garbage collection depends on the logical address of the data request. According to some embodiments, garbage collection is invoked when the allocated blocks are full, even though there are lots of free pages in the flash. Therefore GFTL and RFTL trigger garbage collection very early and there is a large amount of valid pages that need to be copied. In order to represent the results clearly, the experimental results are normalized and the results of GFTL are set to 1. As shown in FIG. 9, the present scheme achieves 95.36% and 86.11% reductions in valid page copies during the garbage collection compared to GFTL and RFTL, respectively. By adopting the overprovisioning strategy that limits the logical address space lower than the entire physical address space, there are more invalid pages in the victim block when running garbage collection compared to Pure-Page-Level. In addition, as discussed above, the number of valid pages in a victim block has an upper bound while that for Pure-Page-Level is not predictable. As a result, the present scheme can achieve a 60.51% reduction, on average, compared to Pure-Page-Level. According to some embodiments, compared to FSR, the present scheme has 21.56% more valid page copies because FSR has a lower space utilization ratio.

FIGS. 10(*a*) through 10(*e*) are bar charts comparing the normalized number of block-erase counts of lazy-RTGC with the normalized number of block-erase counts of on-demand lazy-RTGC, pure-page-level, FSR, RFTL and GFTL for web search, financial, copy file, download file, and play video applications, FIG. 10(*f*) is a bar chart of the average of the normalized number of block-erase counts in accordance with some embodiments of the present disclosure. The number of block-erase counts influences the average system response time and the endurance of NAND flash memory. In order to show the results clearly, the experimental results are normalized and the results of GFTL are set to 1. As shown in FIG. 10, the present scheme achieves 83.66% and 67.38% reductions in block erase counts compared with GFTL and RFTL, respectively. According to some embodiments, that is because, for the central partial garbage collection policy in GFTL and distributed partial garbage collection policy in RFTL, the condition to trigger garbage collection depends on the usage of logical blocks. As a result, these schemes triggers a large number of unnecessary garbage collection operations. According to some embodiments, the on-demand Lazy-RTGC, and FSR reduced the logical address space to guarantee the reclaimed free space, there are more reclaimed free pages after each garbage collection so that it can postpone the next garbage collection operation. As a result, the present scheme has lesser number of block-erase counts compared to Pure-Page-Level and the number of block-erase counts is very close to the one in FSR. According to some embodiments, the on-demand Lazy-RTGC contains two kinds of blocks, namely data block and translation block, and both of them will be erased due to shortage of free space. According to some embodiments, for Web Search, cache replacement incurs many translation-block garbage collections so the block-erase counts are increased 43.59% compared to Lazy-RTGC. According to some embodiments, in other traces, since the logical address space is reduced due to the overprovisioning strategy of translation blocks, the total number of block-erase counts in On-demand Lazy-RTGC is close to that in Lazy-RTGC.

FIG. 11 is a bar chart comparing the space utilization ratio of lazy-RTGC with the space utilization ratio of block-erase counts of on-demand lazy-RTGC, pure-page-level, FSR, RFTL and GFTL in accordance with some embodiments of the present disclosure. In order to achieve the objective of guaranteeing the worst-case system response time, GFTL, RFTL, and the present scheme all introduce extra space overhead. In Lazy-RTGC, the space utilization ratio $\sigma$ is obtained according to Eq. (11). That is, the space utilization ratio of Lazy-RTGC is limited by $U(\sigma)=(64-1)\times 8/(8+1)\times 64=87.5\%$, where $\alpha=\lceil 2000/(220+29) \rceil=8$. According to Eq. (17) in On-demand Lazy-RTGC, the $\sigma_t$ is configured to be=0.5 first to pre-allocate more free blocks for the translation block and then the space utilization ratio of On-demand Lazy-RTGC can be obtained at about 80%. In GFTL, there is a central write buffer to serve the coming write requests when running partial garbage collection, whereas it exists in a distributed write buffer (i.e., buffer block) in RFTL for each logical block. The buffer length in GFTL is limited by $N(k+1)/2$ so the utilization is about 92.18%. RFTL pre-allocated three physical blocks to one logical block; thus the space utilization is very low (about 33.3%). As shown in FIG. 11, the present scheme can achieve an 80.77% reduction on average in extra flash-space overhead compared with RFTL, but costs more space than GFTL. For the reason that FSR cannot get real-time task information, the ratio between the logical space and physical space is set to be 75%. From the experimental results, it is observed that FSR has better average performance and block-erase counts. It cannot, however, guarantee the worst-case system response time. According to some embodiments, Pure-Page-Level does not apply any real-time mechanism so that the space utilization is close to 100%.

According to some embodiments, Table VII presents the experimental results. In these schemes, Pure-Page-Level, FSR, Lazy-RTGC, and On-demand Lazy-RTGC adopt page-level address mapping in which the entire page-level mapping table is cached in the RAM space. As a result, this will introduce large RAM-space cost. As shown in Table VII, for a 32 GB NAND flash memory, the RAM cost for the Pure-Page-Level scheme is 64 MB.

TABLE VII

Memory and Energy Overhead Comparison

| Metrics | Pure-Page-Level | FSR | RFTL | GFTL | Lazy-RTGC | On-demand Lazy-RTGC |
|---|---|---|---|---|---|---|
| RAM overhead (KB) | 65,536 | 49,152 | 1,024 | 12,480 | 57,344 | 6,528 |
| Energy consumption (nJ) | 19.193 | 14.609 | 1.155 | 5.545 | 16.452 | 3.822 |

According to some embodiments, FSR, Lazy-RTGC, and On-demand Lazy-RTGC adopt the overprovisioning strategy that limits the logical address space to be smaller than the physical address space. According to the different space utilization ratios, the RAM costs for FSR, Lazy-RTGC, and On-demand Lazy-RTGC are different. GFTL uses block-level address mapping, but requires a page-level address mapping table to manage the central write buffer. As a result, GFTL needs approximately a 12.2 MB RAM footprint to maintain the address mapping table. RFTL adopts a hybrid-level address mapping scheme and the entire mapping table is stored in the OOB area. Therefore, it can significantly reduce the RAM cost. On-demand Lazy-RTGC stores the entire page-level mapping table in flash memory and caches a small number of mapping items in RAM space, which, as a result, reduces large RAM cost. From the experimental results, on-demand Lazy-RTGC can reduce 90.0% and 47.6% RAM overhead compared to Pure-Page-Level and GFTL, respectively.

According to some embodiments, the energy consumption is affected by the size and number of accesses to RAM. There is research on power consumption analysis of storage devices. According to some embodiments, CACTI 5.3 is selected as the RAM power model. The parameters of the power model are listed in Table VI.

TABLE VI

Parameters of CACTI Power Model [Shyamkumar et al. 2008]

| Parameter | Value |
| --- | --- |
| Capacity (MB) | 16 |
| Output width (bits) | 512 |
| Number of banks | 1 |
| Number of read/write ports | 1 |
| Technology-node (nm) | 65 |
| Temperature (K) | 360 |
| SRAM cell/wordline technology flavor | ITRS HP |
| Peripheral/Global circuitry technology flavor | ITRS HP |
| Wire type inside/outside mat | Semi-global |

According to some embodiments, the energy consumption is calculated by applying different RAM-space requirements from evaluated schemes to the power model and the results are shown in Table VII. Pure-Page-Level, FSR, and Lazy-RTGC adopt page-level mapping by which the entire page-level mapping table is cached in the RAM. The large RAM overhead leads to a large energy overhead in these schemes. RFTL stores the entire mapping table in the OOB area so its RAM overhead and energy consumption are very small. According to some embodiments, however, RFTL has very low space utilization ratio and its average performance is degraded due to a large number of garbage collections. According to some embodiments, GFTL uses the block-level mapping scheme to record primary block mapping and a page-level mapping table is used for the central write buffer. In spite of the fact that the RAM cost and energy cost are better than those of page level mapping schemes, GFTL costs 79.2% extra energy consumption compared to RFTL. To reduce the large energy consumption in Lazy-RTGC, the on-demand approach that stores the entire page-level mapping table in flash memory is implemented, and only caches a small number of mapping items in the RAM. As a result, On-demand Lazy-RTGC can reduce 80.1% and 31.1% RAM energy overhead compared to Pure-Page-Level and GFTL, respectively.

Figure 12:
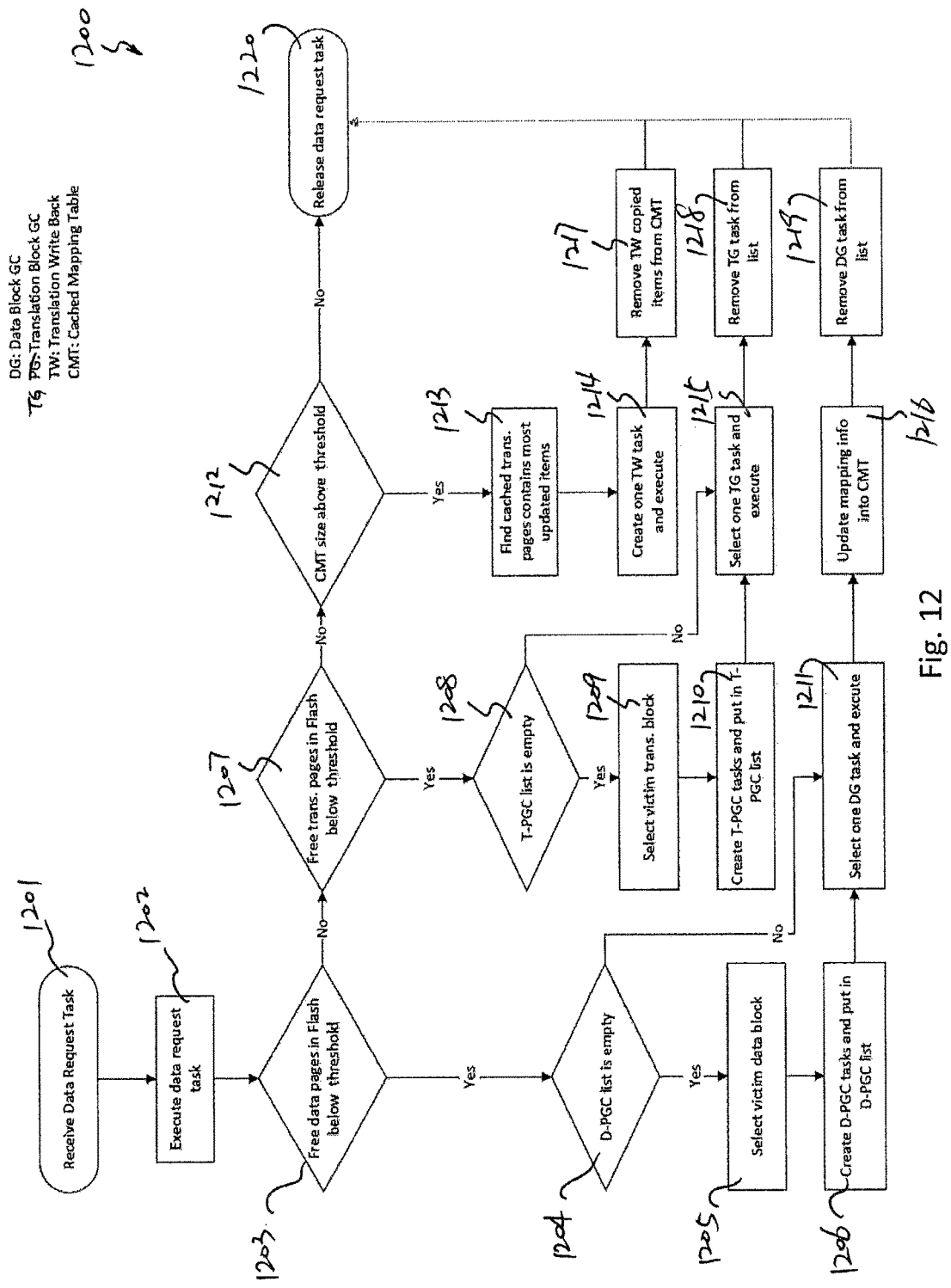
FIG. 12 is a flow chart illustrating the lazy-RTGC in accordance with some embodiments of the present disclosure.

FIG. 12 is a flow chart illustrating the lazy-RTGC in accordance with some embodiments of the present disclosure. At step 1201, receive data request task. At step 1202, execute data request task. Then at step 1203, determine whether free data pages in the flash are below threshold. For the condition that the free data pages in the flash are below threshold, then go to step 1204. At step 1204, determine whether the D-PGC list if empty. For the condition that the D-PGC list is empty, then go to step 1205. At step 1206, create D-PGC tasks and put in D-PGC list. At step 1211, select one $D_G$ task and execute. At step 1216, update mapping information into CMT. At step 1219, remove $D_G$ task from the list. Then finally, at step 1220, release data request task.

At step 1203, if the condition is no, then go to step 1207. At step 1207, determine whether the number of free translation pages in flash is below threshold. For the condition that the free translation pages I flash is not below the threshold, then go to step 1212. At step 1212, determine whether CMT size is above the threshold. For the condition that the CMT size is not above the threshold, then go to step 1220. At step 1220, release data request task.

At step 1212, if the condition is yes, then go to step 1213. At step 1213, find cached translation pages which contain most updated items. Then at step 1214, create one TW task and execute. At step 1217, remove TW copied items from CMT. Then go to step 1220. At step 1220, release data request task.

At step 1207, if the condition is yes, then go to step 1208. At step 1208, determine whether the T-PGC list is empty. For the condition that the T-PGC list is not empty, then go to step 1215. At step 1215, select one TG task and execute. Then at step 1218, remove TG task from the list. And finally, at step 1220, release data request task.

At step 1208, for the condition of yes, go to step 1209, select victim translation block. Then at step 1210, create T-PGC tasks and put it in T-PGC list. At step 1215, select one TG task and execute. At step 1218, remove TG task from list. And finally, at step 1220, release data request task.

At step 1204, for the condition of no, go to step 1211. At step 1211, select one $D_G$ task and execute. At step 1216, update mapping information into CMT. At step 1219, remove $D_G$ task from the list. And finally, at step 1220, release data request task.

According to some embodiments, a method for garbage collection in a NAND flash memory system is disclosed. The method includes the steps of receiving a data request task in the NAND flash memory system; executing the data request task in the NAND flash memory system; based on the condition where the number of free data pages in the NAND flash memory system is below the first pre-determined threshold, determining whether a data block partial garbage collection list is empty; based on the condition where the data block partial garbage collection list is empty, selecting a victim block in the NAND flash memory system; and creating a plurality of data block partial garbage collection tasks.

According to some embodiments, the method further includes assigning the plurality of data block partial garbage collection tasks to a data block partial garbage collection list; selecting a data block garbage collection task from the data block partial garbage collection list and executing the selected data block garbage collection task; updating mapping information into a cached mapping table; removing the selected data block garbage collection task from the data block partial garbage collection list; releasing the data request task in the NAND flash memory system.

According to some embodiments, for the condition where the number of free data pages in the NAND flash memory system is not below the first pre-determined threshold, the method further includes determining whether the number of free translation pages in the NAND flash memory system is below a second pre-determined threshold; based on the condition where the number of free translation pages in the NAND flash memory system is not below the second pre-determined threshold, determining whether cached a mapping table size is above a third pre-determined threshold; based on the condition where the cached mapping table size is not above the third pre-determined threshold, releasing the data request task; based on the condition where the number of free translation pages in the NAND flash memory system is below the second pre-determined threshold, determining whether a translation partial garbage collection list is empty; based on the condition where the translation partial garbage collection list is empty, selecting a victim translation block; creating a plurality of translation partial garbage collection tasks; and assigning the plurality of translation partial garbage collection tasks in the translation partial garbage collection list; selecting a translation block garbage collection task from the translation partial garbage collection list; and executing the translation block garbage collection task.

According to some embodiments, the method further includes removing the translation partial garbage collection task from the translation partial garbage collection list; releasing the data request task in the NAND flash memory system; for the condition that the translation partial garbage collection list is not empty, selecting a translation block garbage collection task from the translation partial garbage collection list; and executing the translation block garbage collection task; removing the translation partial garbage collection task from the translation partial garbage collection list; releasing the data request task in the NAND flash memory system; based on the condition where the cached mapping table size is above the third pre-determined threshold, identifying most updated cached translation pages; creating a translation write back task; and executing the translation write back task.

According to some embodiments, the method further include removing the pages which are copied by the translation write back task from the cached mapping table; and releasing the data request task in the NAND flash memory system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for garbage collection in a NAND flash memory system, the method comprising:
   receiving a data request task in the NAND flash memory system;
   executing the data request task in the NAND flash memory system;
   based on a determination that the number of free data pages in the NAND flash memory system is below a first pre-determined threshold, determining whether a data block partial garbage collection list is empty;
   based on a determination that the data block partial garbage collection list is empty,
      selecting a victim block in the NAND flash memory system, and
      creating a plurality of data block partial garbage collection tasks to be performed to reclaim space in the NAND flash memory system; and
   based on a determination that the number of free data pages in the NAND flash memory system is not below the first pre-determined threshold, determining whether the number of free translation pages in the NAND flash memory system is below a second pre-determined threshold.

2. The method of claim 1, further comprising:
   assigning the plurality of data block partial garbage collection tasks to a data block partial garbage collection list.

3. The method of claim 2, further comprising:
   selecting a data block garbage collection task from the data block partial garbage collection list and executing the selected data block garbage collection task.

4. The method of claim 3, further comprising:
   updating mapping information into a cached mapping table.

5. The method of claim 4, further comprising:
   removing the selected data block garbage collection task from the data block partial garbage collection list.

6. The method of claim 5, further comprising:
   releasing the data request task in the NAND flash memory system.

7. A method for garbage collection in a NAND flash memory system, the method comprising:
   receiving a data request task in the NAND flash memory system;
   executing the data request task in the NAND flash memory system;
   based on a determination that the number of free data pages in the NAND flash memory system is below a first pre-determined threshold, determining whether a data block partial garbage collection list is empty;
   based on a determination that the data block partial garbage collection list is empty,
      selecting a victim block in the NAND flash memory system, and
      creating a plurality of data block partial garbage collection tasks to be performed to reclaim space in the NAND flash memory system;
   based on a determination that the number of free data pages in the NAND flash memory system is not below the first pre-determined threshold, determining whether the number of free translation pages in the NAND flash memory system is below a second pre-determined threshold;
   based on a determination that the number of free translation pages in the NAND flash memory system is not below the second pre-determined threshold, determining whether a cached mapping table size is above a third pre-determined threshold; and
   based on a determination that the cached mapping table size is not above the third pre-determined threshold, releasing the data request task.

8. A method for garbage collection in a NAND flash memory system, the method comprising:
   receiving a data request task in the NAND flash memory system;
   executing the data request task in the NAND flash memory system;
   based on a determination that the number of free data pages in the NAND flash memory system is below a first pre-determined threshold, determining whether a data block partial garbage collection list is empty;

based on a determination that the data block partial garbage collection list is empty,
  selecting a victim block in the NAND flash memory system, and
  creating a plurality of data block partial garbage collection tasks to be performed to reclaim space in the NAND flash memory system;
based on a determination that the number of free data pages in the NAND flash memory system is not below the first pre-determined threshold, determining whether the number of free translation pages in the NAND flash memory system is below a second pre-determined threshold;
based on a determination that the number of free translation pages in the NAND flash memory system is below the second pre-determined threshold, determining whether a translation partial garbage collection list is empty; and
based on a determination that the translation partial garbage collection list is empty, selecting a victim translation block.

9. The method of claim 8, further comprising:
creating a plurality of translation partial garbage collection tasks; and
assigning the plurality of translation partial garbage collection tasks in the translation partial garbage collection list.

10. The method of claim 9, further comprising:
selecting a translation block garbage collection task from the translation partial garbage collection list; and
executing the translation block garbage collection task.

11. The method of claim 10, further comprising:
removing the translation partial garbage collection task from the translation partial garbage collection list.

12. The method of claim 11, further comprising:
releasing the data request task in the NAND flash memory system.

13. The method of claim 8, further comprising:
based on a determination that the translation partial garbage collection list is not empty, selecting a translation block garbage collection task from the translation partial garbage collection list; and
executing the translation block garbage collection task.

14. The method of claim 13, further comprising:
removing the translation partial garbage collection task from the translation partial garbage collection list.

15. The method of claim 14, further comprising:
releasing the data request task in the NAND flash memory system.

16. The method of claim 7, further comprising:
based on a determination that the cached mapping table size is above the third pre-determined threshold, identifying most updated cached translation pages.

17. The method of claim 16, further comprising:
creating a translation write back task; and
executing the translation write back task.

18. The method of claim 17, further comprising:
removing the pages which are copied by the translation write back task from the cached mapping table.

19. The method of claim 17, further comprising:
releasing the data request task in the NAND flash memory system.

* * * * *